United States Patent
Hrebejk et al.

(10) Patent No.: US 6,906,722 B2
(45) Date of Patent: *Jun. 14, 2005

(54) GRAPHICAL USER INTERFACE FOR DETERMINING DISPLAY ELEMENT ATTRIBUTE VALUES

(75) Inventors: Petr Hrebejk, Usti nad Labem (CZ); Martin Matula, Prague (CZ)

(73) Assignee: Sun Microsystems, Inc., Santa Clara, CA (US)

(*) Notice: Subject to any disclaimer, the term of this patent is extended or adjusted under 35 U.S.C. 154(b) by 528 days.

This patent is subject to a terminal disclaimer.

(21) Appl. No.: 09/819,294

(22) Filed: Mar. 27, 2001

(65) Prior Publication Data

US 2002/0113821 A1 Aug. 22, 2002

Related U.S. Application Data

(63) Continuation of application No. 09/789,222, filed on Feb. 20, 2001.

(51) Int. Cl.[7] .................................................. G09G 5/00
(52) U.S. Cl. ........................ 345/581; 345/762; 345/763; 345/764
(58) Field of Search ................................ 345/581, 762, 345/763, 764

(56) References Cited

U.S. PATENT DOCUMENTS 5,818,444 A * 10/1998 Alimpich et al. ........... 345/765

* cited by examiner

Primary Examiner—Matthew C. Bella
Assistant Examiner—Tam Tran
(74) Attorney, Agent, or Firm—Gunnison, McKay & Hodgson, L.L.P.

(57) ABSTRACT

A method for determining display element attribute values from an object represented by the display element includes defining a display element view including at least one elementary view that is capable of determining a display element attribute value, receiving a display element attribute value request, determining the first view for the display element and ascertaining at least one display element attribute value for the display element based upon the first view. An apparatus for determining display element attribute values from an object represented by the display element includes a definer to define a display element view including at least one elementary view that is capable of determining a display element attribute value, a receiver to receive a display element attribute value request, a determiner to determine the first view for the display element and an ascertainer to ascertain at least one display element attribute value for the display element based upon the first view.

2 Claims, 23 Drawing Sheets

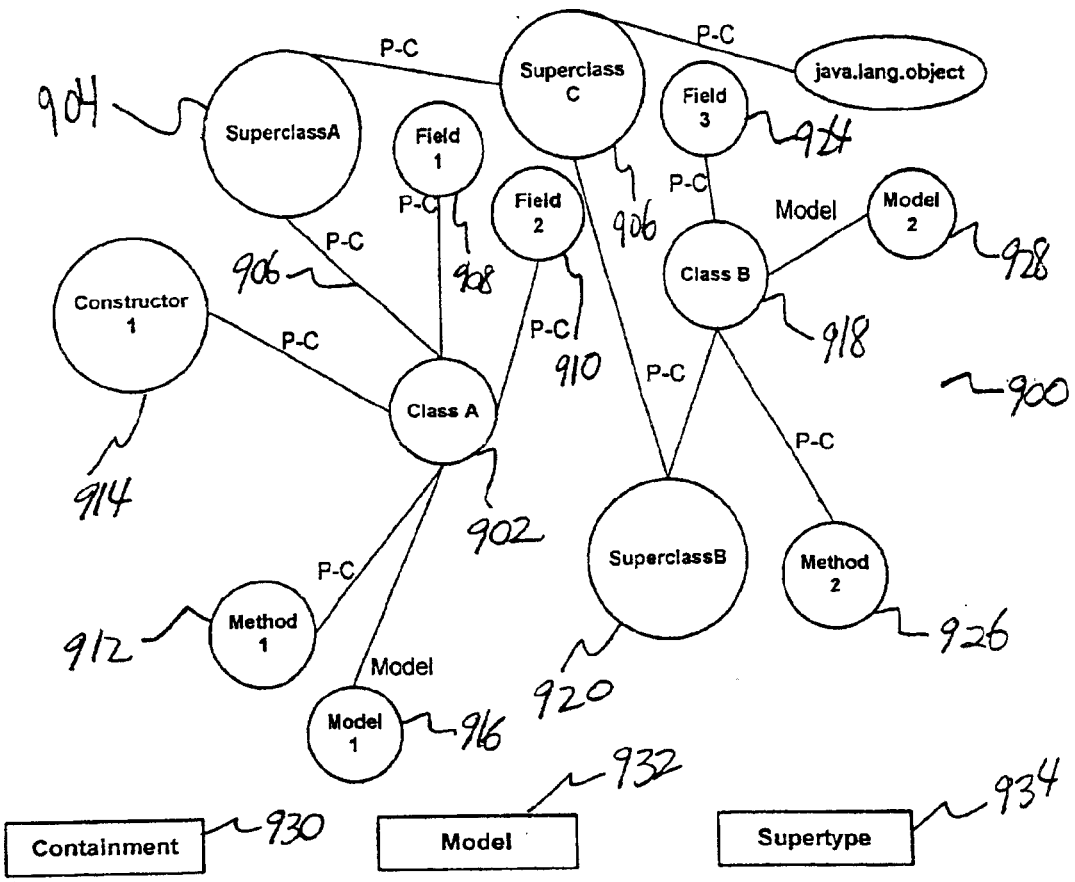
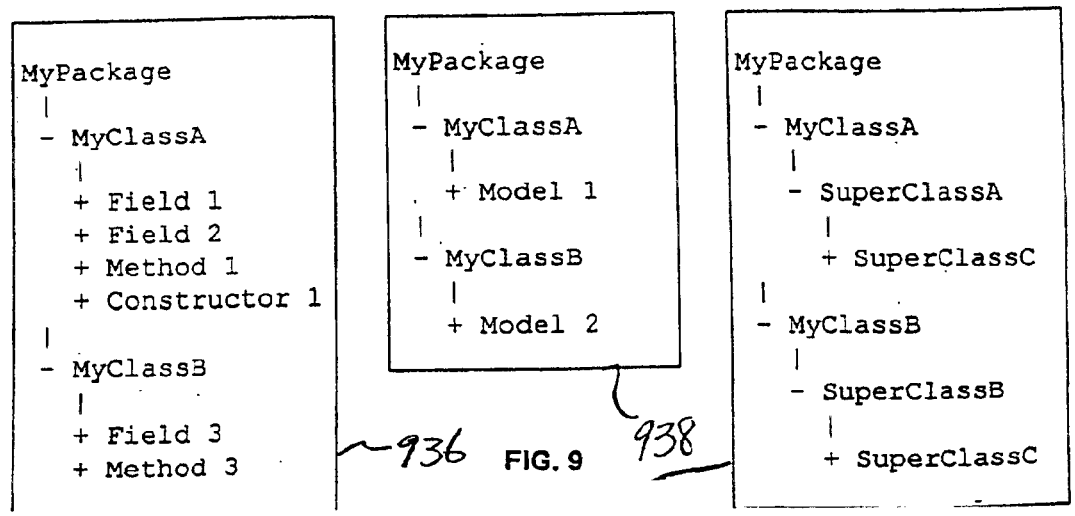
FIG. 9

Composite View 1 = {Elementary View 1, Elementary View 2, Elementary View 3}
 = {Attribute Value 1A, Attribute Value 1B,
    Attribute Value 2A, Attribute Value 2B,
    Attribute Value 3A, Attribute Value 3B}

Composite View 2 = {Elementary View 2, Elementary View 3}
 = {Attribute Value 2A, Attribute Value 2B,
    Attribute Value 3A, Attribute Value 3B}

GRAPHICAL USER INTERFACE FOR DETERMINING DISPLAY ELEMENT ATTRIBUTE VALUES

This application is a continuation of 09/789,222 filed Feb. 20, 2001.

FIELD OF THE INVENTION

The present invention relates to the field of computer science. More particularly, the present invention relates to a method and apparatus for determining display element attribute values.

BACKGROUND OF THE INVENTION

Software applications such as Graphical User Interfaces (GUIs) that display information about a program or a file system typically display the information using a particular display form. The system to be displayed is typically divided into objects that may be related to one or more other objects. A display element is an object or element that represents an object. The represented object may be any object used in the system being represented, such as an application file, database record or Java™ field. A display form determines how display elements are displayed. Some typical examples of display forms include a tree form, a cascade form and a list form. Each display element has a set of attributes that is determined by a particular display form; the set of attributes is independent from the object that is represented by the display element. These relationships are illustrated with reference to FIGS. 1–5, below.

FIG. 1 is a block diagram that illustrates a tree display form. Tree 100 represents a data hierarchy using NetBeans Explorer, available from Sun Microsystems of Palo Alto, Calif. Tree 100 includes display elements 102–150. Each display element has several properties. The single-valued properties include the name and icon. The multi-valued properties include the children, actions and referenced object properties. The children property includes display elements that are displayed under another display element. For example, the children property of display element 110 includes display elements 112 and 114. The "actions" property includes actions that may be performed on the display element. The actions may be displayed in a pop-up menu 152. As shown in FIG. 1, the actions available for display element 146 include Open 154, "Customize Bean" 156, Compile 158, Execute 160, Cut 162, Copy 164, New 166, Delete 168, Rename 170 and "Save as Template" 172. The referenced object properties are properties of the object represented by the display element. As shown in FIG. 1, the properties for the object represented by display element 146 are presented in a separate window 174.

FIG. 2 is a block diagram that illustrates another tree display form. Tree 200 represents a file system displayed using Microsoft Explorer, available from Microsoft Corporation of Redmond, Wash. The properties of display element 202 include the actions that can be performed on the display element, represented by pop-up menu 204. The properties of display element 202 also include the properties of the represented object, represented by window 206.

FIG. 2 also illustrates a containment relationship. A containment relationship shows the objects contained by another object. This relationship is typically displayed in the form of a tree. For example, folder beans 208 is "contained" by folder bdk1.1 (210) and folder bdk1.1 (210) is contained by folder 212.

FIG. 3 is a block diagram that illustrates a cascade display form. Unlike the tree display form, cascade display form 300 has only single-valued action attributes. The only action is the action performed when the user clicks on the element. The cascade display form 300 also has no referenced object properties. In other words, the cascade display form 300 does not display properties of the object represented by the display element.

FIG. 4 is a block diagram that illustrates a list display form. List display form 400 has the following single-valued attributes: display name, icon and type. The type attribute values are displayed in column 402. List display form 400 also includes a multi-valued "actions" attribute. The actions are for display element 404 displayed in pop-up menu 406.

FIG. 5 is a block diagram that illustrates another list display form. Display form 500 is the same as display form 400 in FIG. 4, except that list display form 500 has no "Type" property.

Present day software applications typically lack the ability to display multiple types of object relationships. What is needed is a solution that enables the display of selected object relationships. A further need exists for such a solution that is configurable and that provides for multiple ways of viewing object relationships within the same net.

BRIEF DESCRIPTION OF THE INVENTION

A method for determining display element attribute values from an object represented by the display element includes defining a display element view including at least one elementary view that is capable of determining a display element attribute value, receiving a display element attribute value request, determining the first view for the display element and ascertaining at least one display element attribute value for the display element based upon the first view. An apparatus for determining display element attribute values from an object represented by the display element includes a definer to define a display element view including at least one elementary view that is capable of determining a display element attribute value, a receiver to receive a display element attribute value request, a determiner to determine the first view for the display element and an ascertainer to ascertain at least one display element attribute value for the display element based upon the first view.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 9 is a block diagram that illustrates three views and associated displays of a Java™ program in accordance with one embodiment of the present invention.

DETAILED DESCRIPTION OF A PREFERRED EMBODIMENT

Embodiments of the present invention are described herein in the context of a method and apparatus for determining display element attribute values. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

Figure 6:
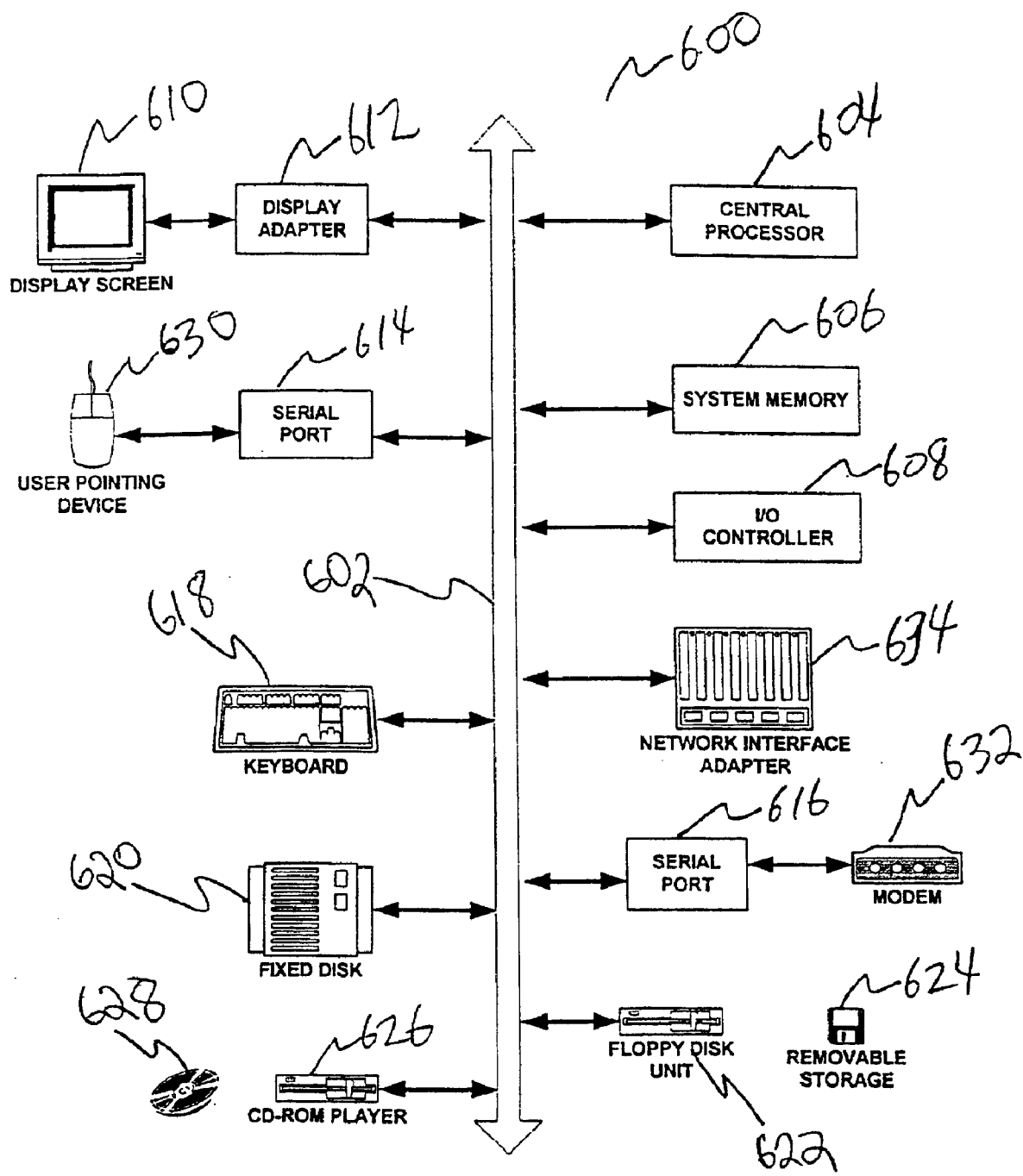
FIG. 6 is a block diagram of a computer system suitable for implementing aspects of the present invention.

FIG. 6 depicts a block diagram of a computer system 600 suitable for implementing aspects of the present invention. As shown in FIG. 6, computer system 600 includes a bus 602 which interconnects major subsystems such as a central processor 604, a system memory 606 (typically RAM), an input/output (I/O) controller 608, an external device such as a display screen 610 via display adapter 612, serial ports 614 and 616, a keyboard 618, a fixed disk drive 620, a floppy disk drive 622 operative to receive a floppy disk 624, and a CD-ROM player 626 operative to receive a CD-ROM 628. Many other devices can be connected, such as a pointing device 630 (e.g., a mouse) connected via serial port 614 and a modem 632 connected via serial port 616. Modem 632 may provide a direct connection to a remote server via a telephone link or to the Internet via a POP (point of presence). Alternatively, a network interface adapter 634 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 6 to be present to practice the present invention, as discussed below. Furthermore, the devices and subsystems may be interconnected in different ways from that shown in FIG. 6. The operation of a computer system such as that shown in FIG. 6 is readily known in the art and is not discussed in detail in this application, so as not to overcomplicate the present discussion. Code to implement the present invention may be operably disposed in system memory 606 or stored on storage media such as fixed disk 620, floppy disk 624 or CD-ROM 626.

According to embodiments of the present invention, views are defined for objects comprising a net. A view determines display element attribute values for an object represented by the display element. Elementary views may be combined to form composite views, with duplicate attribute values removed. A view may be set for each display element.

Figure 7:
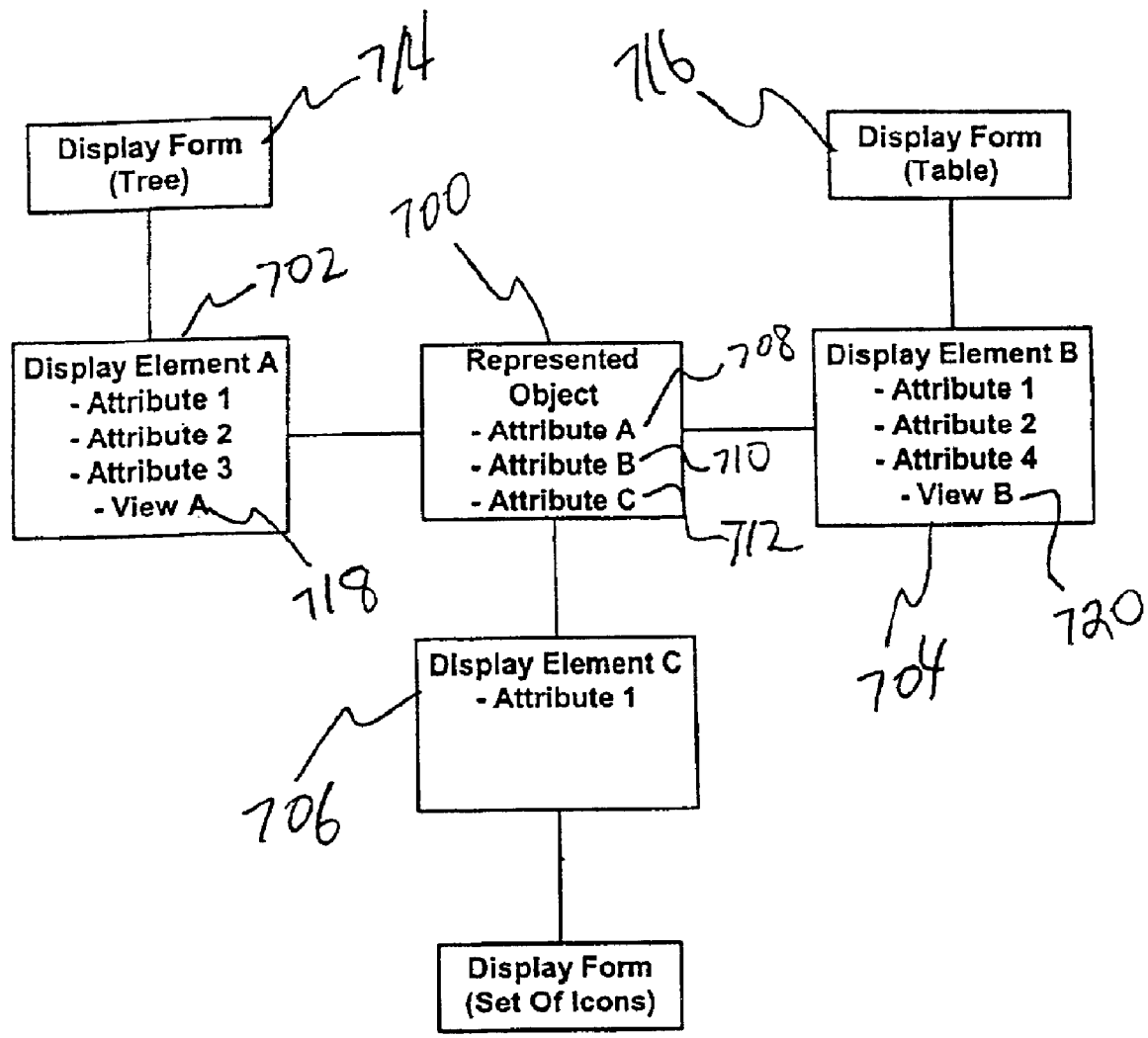
FIG. 7 is a block diagram that illustrates the relationship between display forms, display elements, represented objects and views in accordance with embodiments of the present invention.

FIG. 7 is a block diagram that illustrates the relationship between display forms, display elements, represented objects and views in accordance with embodiments of the present invention. A display element is an object or element used for representing an object. The represented object depends upon the information being displayed. For example, the objects in a file system display application may include files, and the objects in a Java™ program display application may include a Java™ class. As shown in FIG. 7, object 700 is represented by display elements A 702, B 704 and C 706. Object 700 includes attributes 708, 710 and 712. Display element A 702 is associated with a tree form 714, which determines the attributes for display element 702. Likewise, display element B 704 is associated with a tree form 716, which determines the attributes for display element B 704. View A 718 is associated with display element A 702 and view B 720 is associated with display element B 704. Display element C 706 is not associated with a view and thus uses the view of a related display element. Each view determines which display element attribute values are displayed for a particular display element.

Figure 8:
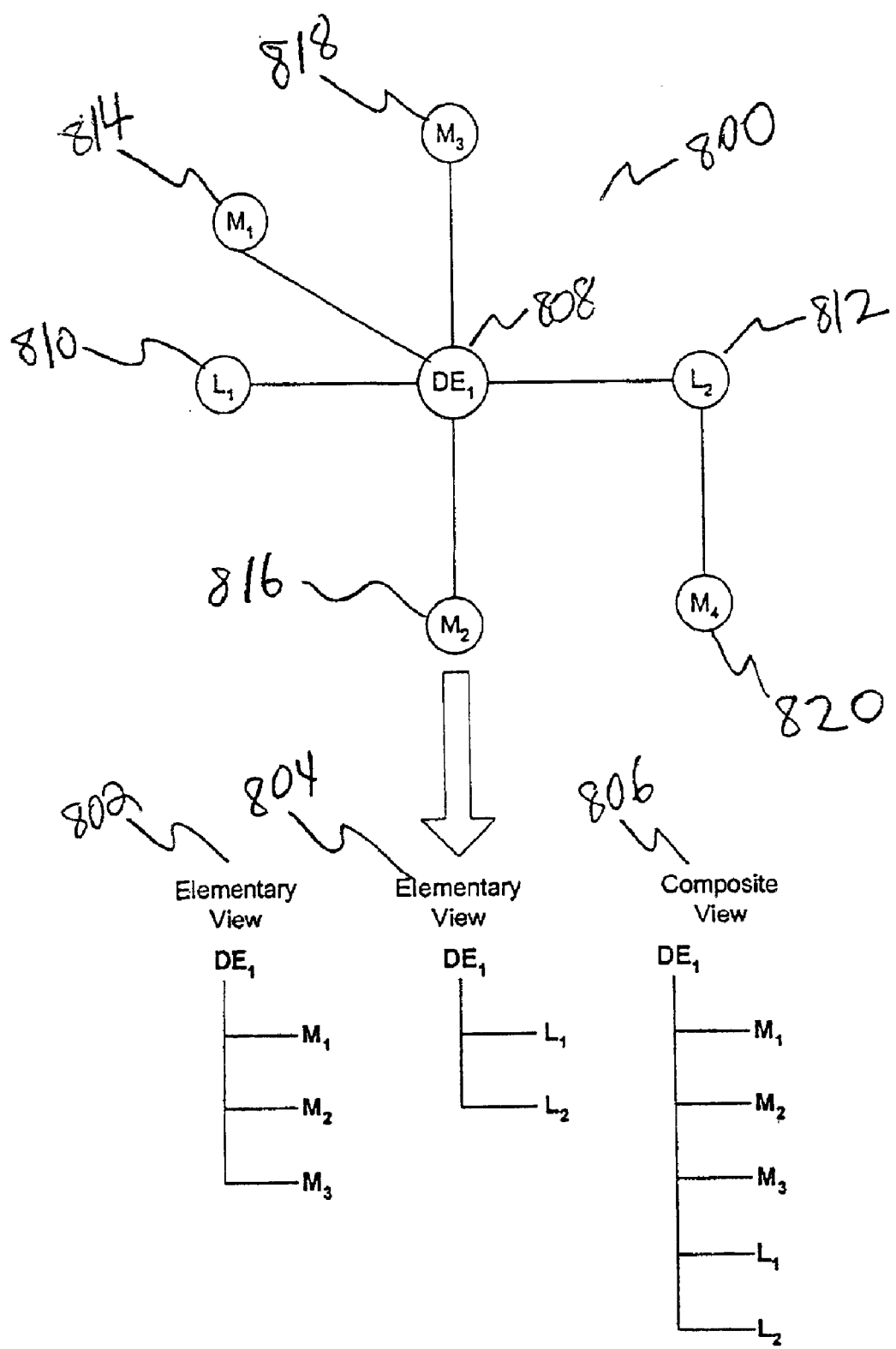
FIG. 8 is a block diagram that illustrates defining elementary and composite views in accordance with one embodiment of the present invention.

FIG. 8 is a block diagram that illustrates defining elementary and composite views in accordance with one embodiment of the present invention. FIG. 8 includes net diagram 800 and three views 802, 804, 806 that are based upon the net diagram 800. Net diagram 800 includes an object 808 that represents a display element $DE_1$. Net diagram 800 also includes several objects related to $DE_1$. Objects $L_1$ (810) and $L_2$ (812) have a first type of relationship with object 808. Objects $M_1$ (814), $M_2$ (816) and $M_3$ (818) have a second type of relationship with object 808. Object $M_4$ (820) has the second type of relationship with object $L_2$ (812).

According to embodiments of the present invention, attributes may be single-valued or multi-valued. An example of a single valued attribute is descriptive information relating to the display element, such as a name. An example of a multi-valued attribute is a list of items contained by the display element (e.g. a list of child display elements). Another example of a multi-valued attribute is actions that may be performed on a display element.

Still referring to FIG. 8, views 802, 804, 806 provide values of a multi-valued attribute named "children". Elementary view 802 returns objects of type M as values of the "children" attribute. In this case, the returned objects include $M_1$ (814), $M_2$ (816) and $M_3$ (818). Elementary view 804 returns objects of type L as values of the "children" attribute. The objects are $L_1$ (810) and $L_2$ (812). View 806 is a composite view including views 802 and 804 and thus returns the result of merging values returned from views 802 and 804. Thus, the objects returned for composite view 806 include $M_1$ (814), $M_2$ (816), $M_3$ (818), $L_1$ (810) and $L_2$ (812).

Turning now to FIG. 9, a more specific example of defining views in accordance with one embodiment of the present invention is presented. FIG. 9 is a block diagram that illustrates three views and associated displays of a Java™ program in accordance with one embodiment of the present invention. Net 900 illustrates relationships between objects in a Java™ program. ClassA 902 inherits from SuperClassA 904, as indicated by parent-child (P-C) relationship 906. SuperClassA 904 inherits from SuperClassC 906. ClassA 902 includes field 1 (908), field 2 (910), method 1 (912) and constructor 1 (914). Model 1 916 is a model associated with ClassA 924. ClassB 918 inherits from SuperClassB 920, as indicated by parent-child relationship 922. ClassB 918 includes field 3 (924) and method 2 (926). Model 2 928 is a model associated with classB 918.

Reference numerals 930, 932 and 934 represent three different views of net 900. Views 936, 938 and 940 provide values of a multi-valued attribute named "subelement". Elementary view 930 returns objects of type "contained elements" as values of the subelement attribute. Elementary view 932 returns objects of type "model" as values of the subelement attribute. Elementary view 934 returns objects of type "supertype" as values of the subelement attribute. Reference numerals 936, 938, 940 represent displays corresponding to views 930, 932, 934, respectively. Thus, display 936 includes only objects of type "contained elements", display 938 includes only objects of type "model" and display 940 includes only objects of type "supertype".

Views 930, 932, 934 are elementary views because they select only one type of relationship. According to embodiments of the present invention, views may be configured by adding one or more views to another view. By way of example, combining view 930 with view 934 creates a composite view that includes contained display elements and supertype display elements. Using the example illustrated in FIG. 9, such a composite view is useful for determining the methods and fields that a class inherits from its supertypes. Likewise, combining view 932 with view 934 creates a composite view that includes supertype display elements and associated models.

Figure 10:
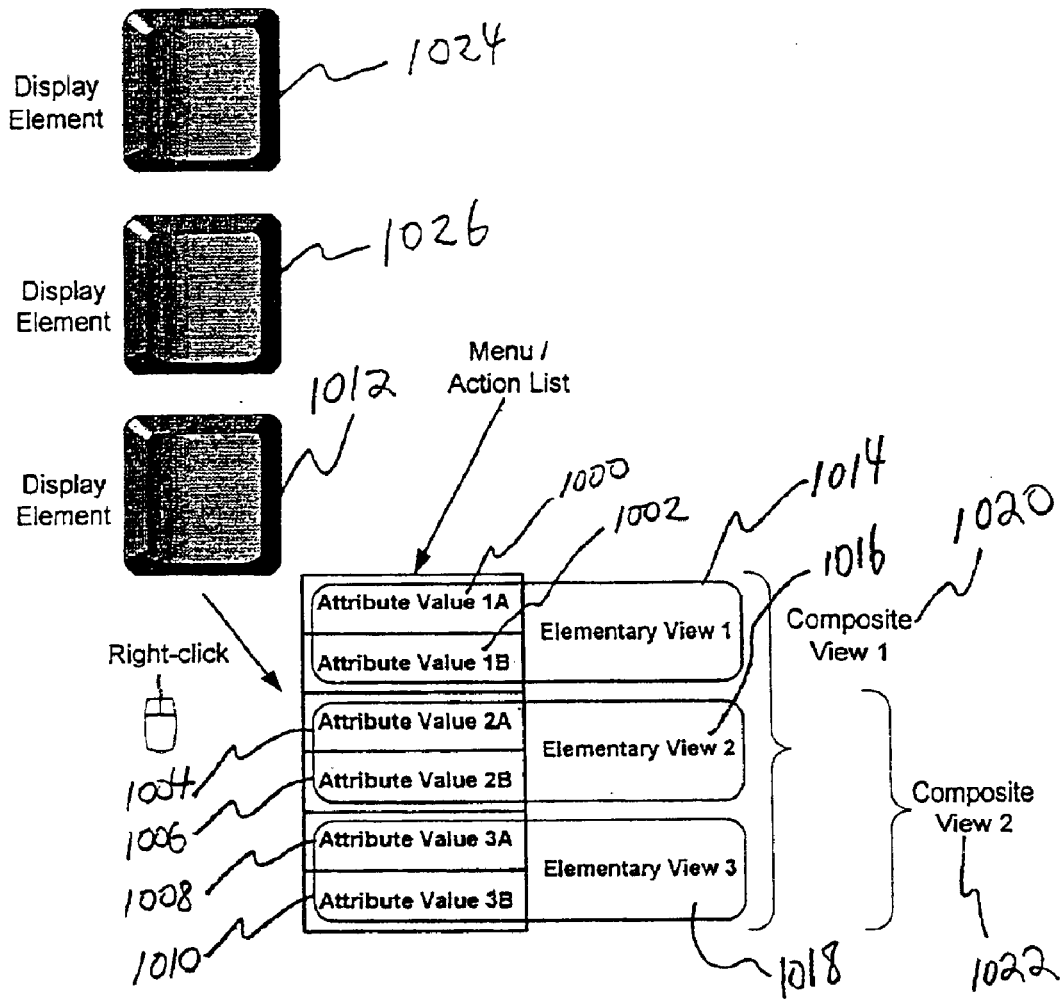
FIG. 10 is a block diagram that illustrates displaying a view in accordance with one embodiment of the present invention.

FIG. 10 is a block diagram that illustrates displaying a view in accordance with one embodiment of the present invention. As is common in the art, clicking the right side of a mouse when an icon is selected typically results in a sub-menu display. The sub-menu display includes actions available with respect to the selected display element and actions available with respect to the object represented by the display element. In a file system, for example, attribute values 1000–1010 could include actions such as "Copy", "Cut", "Paste", "Delete" and "Rename". According to one embodiment of the present invention, attribute values such as the ones described above are combined into elementary views and one or more elementary views may be combined into a composite view. Either an elementary view or a composite view may be assigned to a display element.

Still referring to FIG. 10, elementary view 1 (1014) returns a first type of object value as values for the "actions" attribute. Attribute value 1A (1000) and attribute value 1B (1002) belong to this first object type. Elementary view 2 (1016) returns a second type of object value as values for the "actions" attribute. Attribute value 2A (1004) and attribute value 2B (1006) belong to this second object type. Elementary view 3 (1018) returns a third type of object value as values for the "actions" attribute. Attribute value 3A (1008) and attribute value 3B (1010) belong to this third object type. Composite view 1 (1020) includes elementary views 1014, 1016 and 1018 and composite view 1022 includes elementary views 1016 and 1018. Thus, for example, when a display element associated with composite view 2 (1022) is selected, the resulting menu would display values for the second and third object type, namely, attribute values 2A (1004), 2B (1006), 3A (1008) and 3B (1010). The objects represented by display elements 1024, 1026 and 1012 may be associated with separate views.

According to embodiments of the present invention, a composite view may be changed dynamically. A composite view may be changed by adding one or more elementary or composite view or by removing one or more elementary or composite view included in the composite view.

Figure 1:
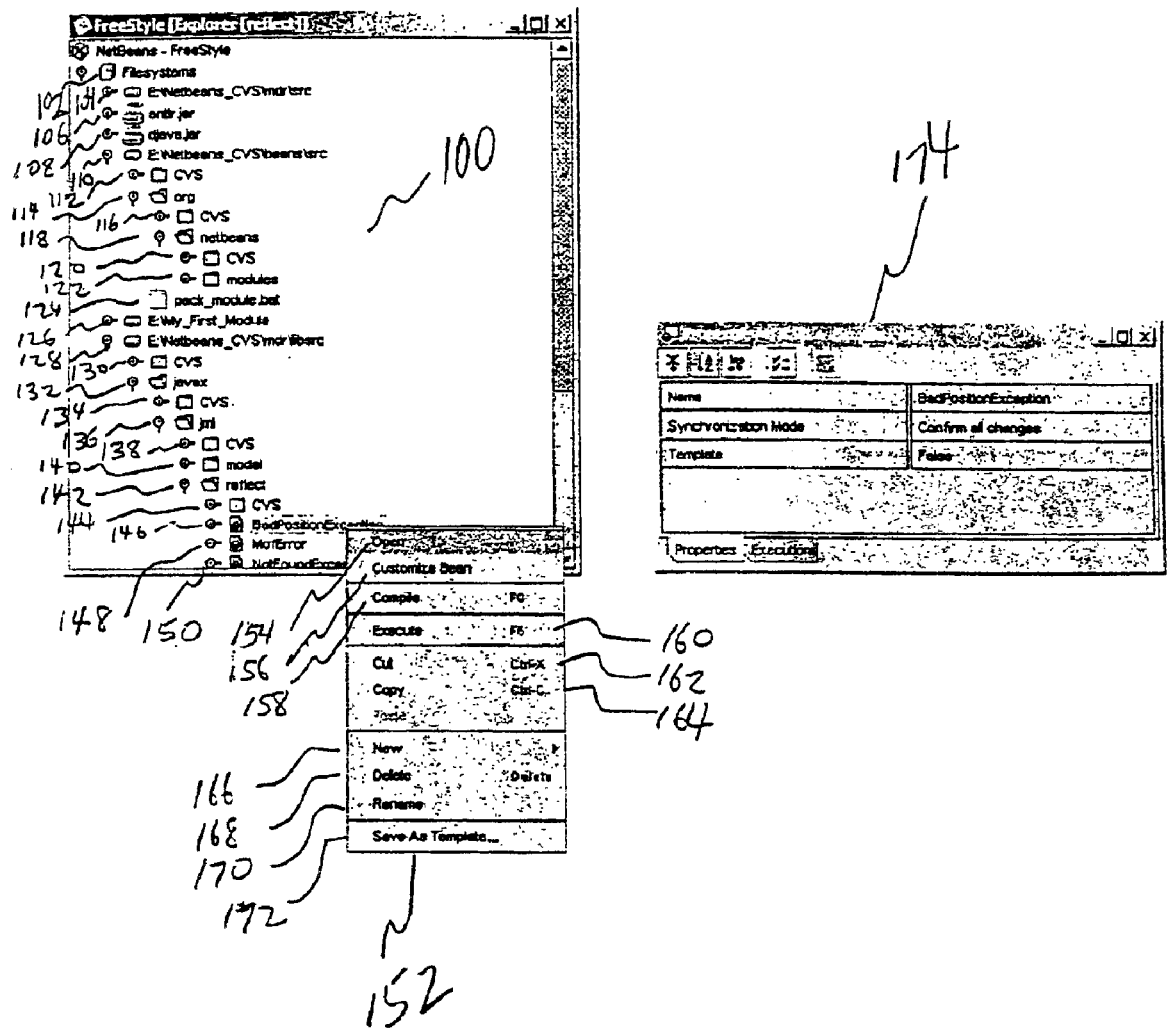
FIG. 1 is a block diagram that illustrates a tree display form.
Figure 2:
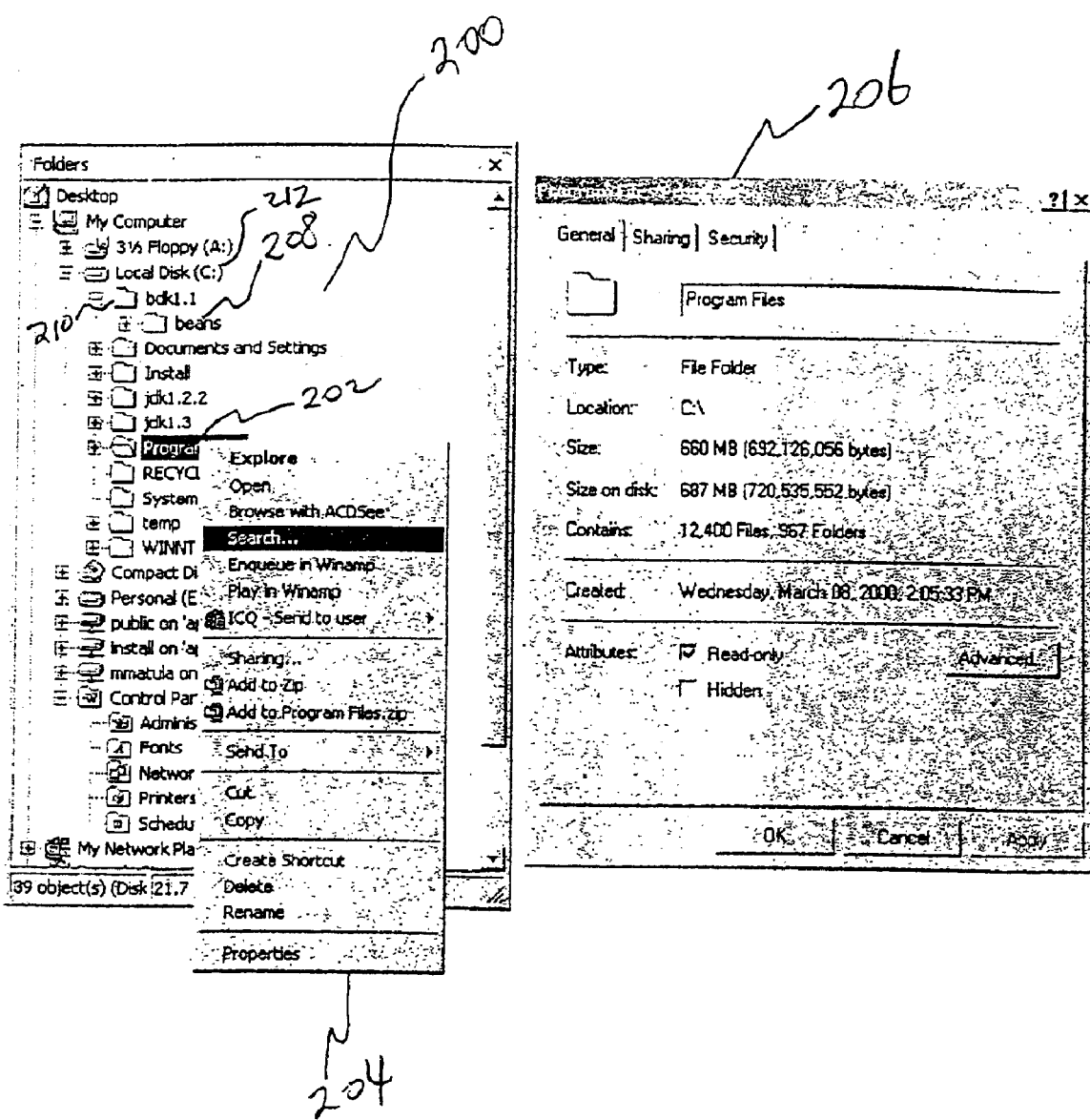
FIG. 2 is a block diagram that illustrates a tree display form.
Figure 3:
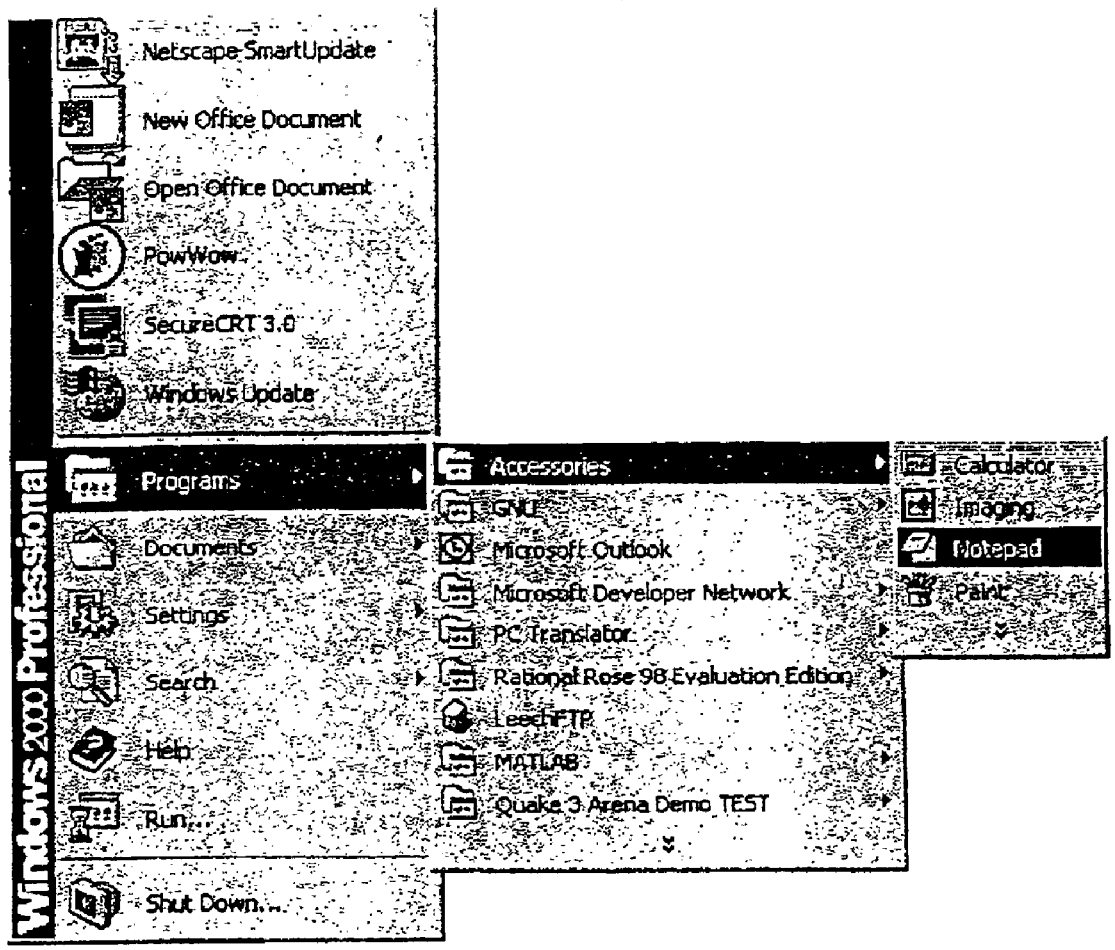
FIG. 3 is a block diagram that illustrates a cascade display form.
Figure 4:
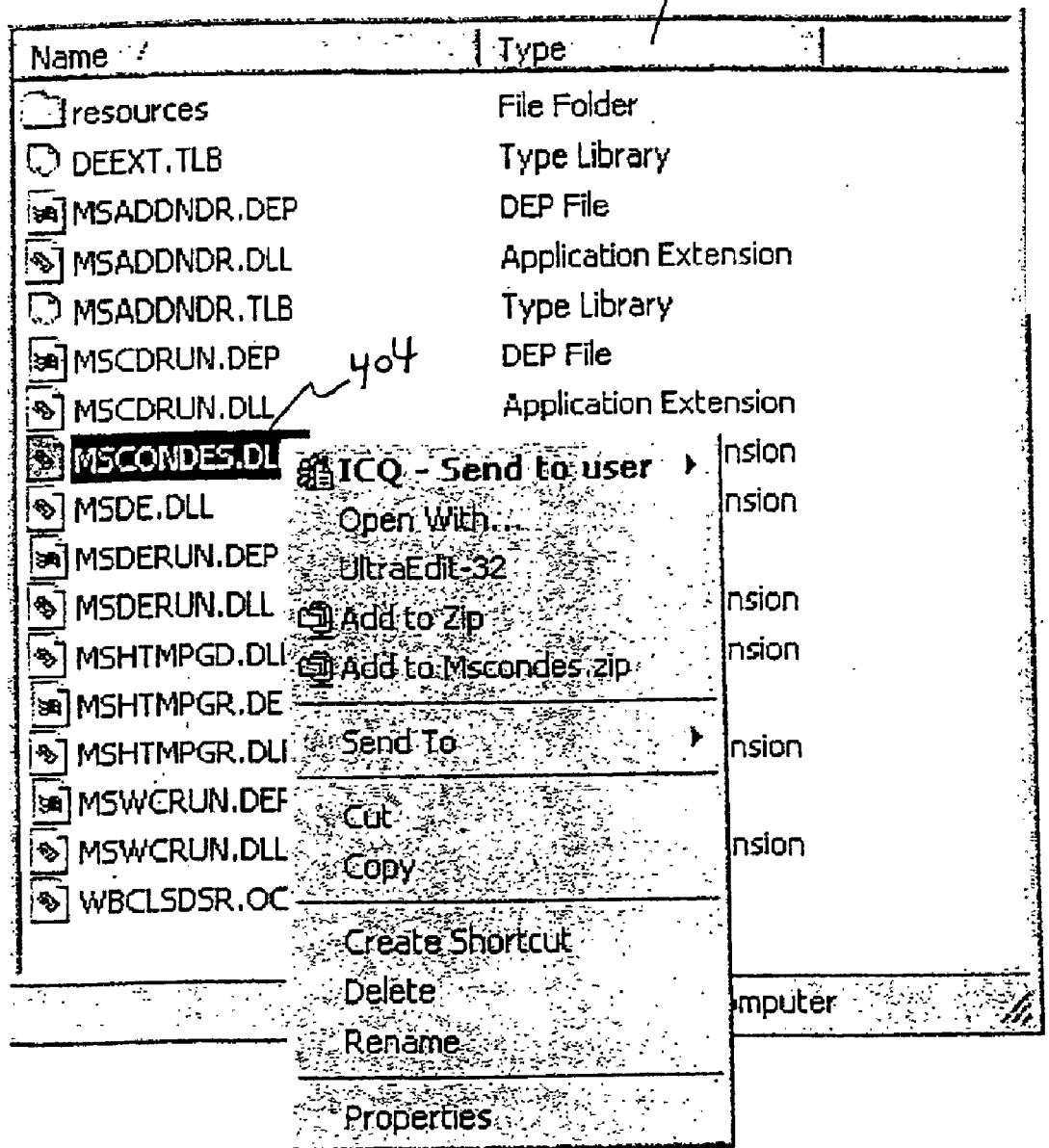
FIG. 4 is a block diagram that illustrates a list display form.
Figure 5:
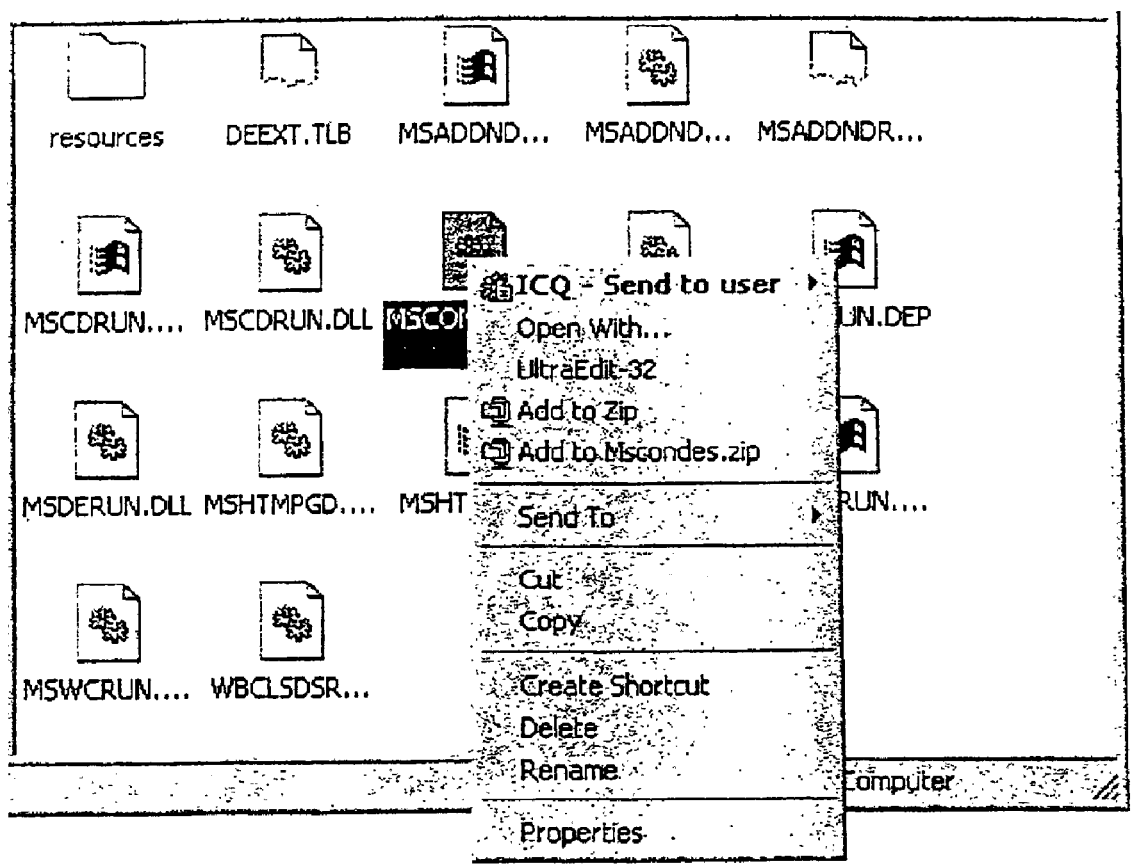
FIG. 5 is a block diagram that illustrates a list display form.
Figure 11:
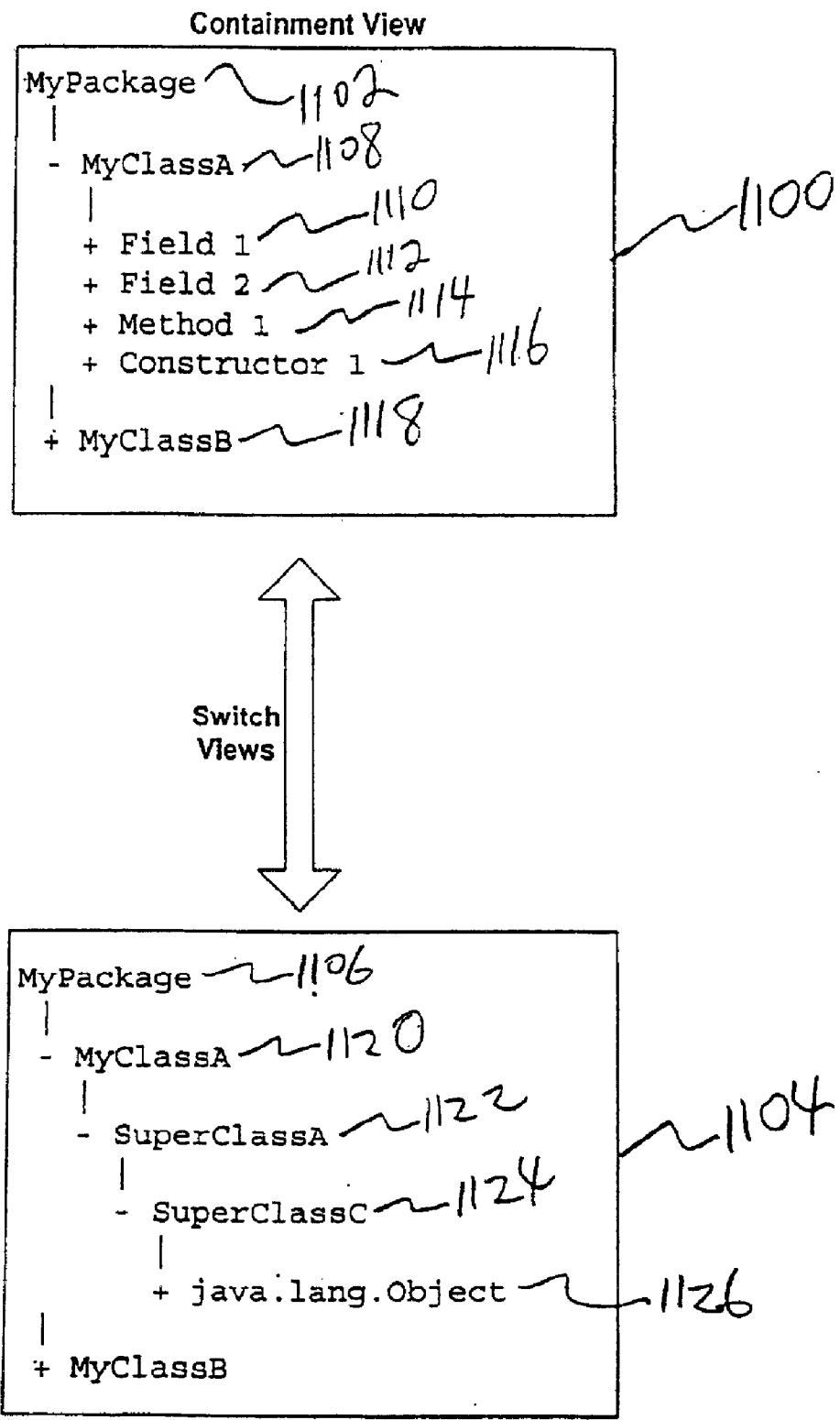
FIG. 11 is a block diagram that illustrates switching between views in accordance with one embodiment of the present invention.

FIG. 11 is a block diagram that illustrates switching between views in accordance with one embodiment of the present invention. FIG. 11 includes a containment view 1100 of Java™ package MyPackage 1102 and an inheritance view 1104 of the same package. MyPackage 1102, 1106 corresponds with net 900 of FIG. 9. In the example illustrated by FIG. 11, display element MyPackage 1102 is initially associated with a containment view 1100. Thus, expanding the display element results in a display that includes all contained items. MyClassA 1108 contains field 1 (1110), field 2 (1112), method 1 (1114) and constructor 1 (1116). MyClassB 1118 is unexpanded in FIG. 1.

Still referring to FIG. 11, a user changes the view associated with display element MyPackage 1102 from a containment view 1100 to an inheritance view 1104. Unlike containment view 1100, inheritance view 1104 shows all items from which a display element inherits. MyClassA 1120 inherits from SuperClassA (1122). SuperClassA (1122) inherits from SuperClassC (1124) and SuperClassC (1124) inherits from java.lang.Object 1126.

The illustration of containment views and inheritance views is for purposes of illustration and is not intended to be limiting in any way. Those of ordinary skill in the art will recognize that other views may be used.

Figure 12:
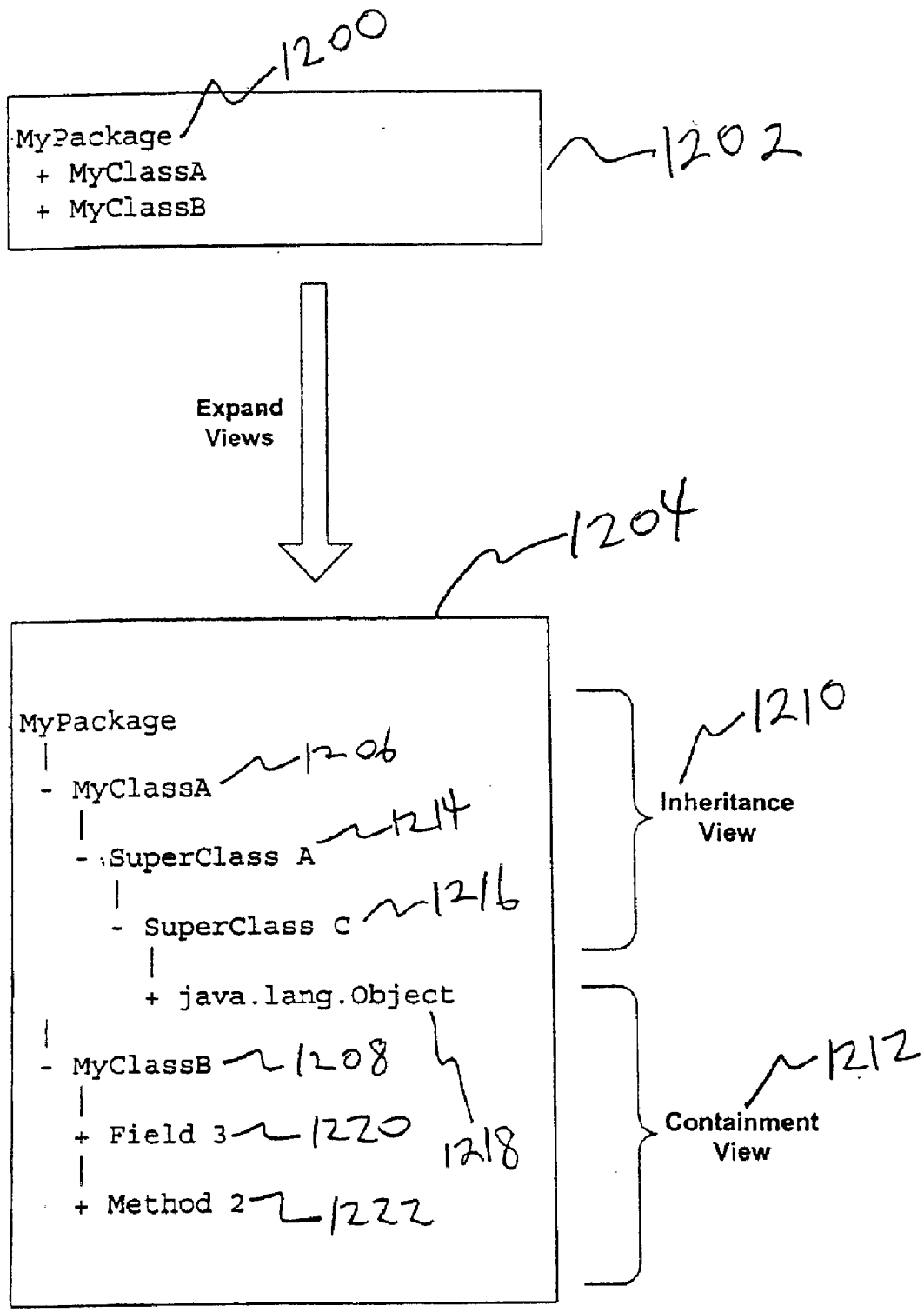
FIG. 12 is a block diagram that illustrates display elements having different views within the same display in accordance with one embodiment of the present invention.

FIG. 12 is a block diagram that illustrates display elements having different views within the same display in accordance with one embodiment of the present invention. Display element MyPackage 1200 corresponds with net 900 of FIG. 9. FIG. 12 includes an initial display 1202 and an expanded display 1204. Display element 1206 is associated with an inheritance view 1210 and display element 1208 is associated with a containment view 1212.

Expanding display element 1206 results in a display that includes all items from which MyClassA 1206 inherits. As shown in FIG. 12, MyClassA 1206 inherits from SuperClassA 1214. SuperClassA 1214 inherits from SuperClassC 1216 and SuperClassC 1216 inherits from java.lang.Object 1218. Expansion of display element MyClassA 1206 begins with examining the view associated with display element MyClassA 1206. In the present example, MyClassA 1206 is associated with an inheritance view. Thus, SuperClassA 1214 is displayed. Next, SuperclassA 1214 is selected for expansion and the view associated with display element SuperClassA 1214 is examined. According to one embodiment of the present invention, a display element uses the view associated with the closest parent display element when the display element has no view directly associated with it. Thus, if display element SuperClassA 1214 has a view associated with it, that view is used to determine what to display. If display element SuperClassA 1214 has no view associated with it, the view associated with its parent display element (MyClassA 1206) is used to determine what to display. This process continues for display element SuperClassC 1216 and display element java.lang.Object 1218 when the display elements are selected for expansion.

Still referring to FIG. 12, display element MyClassB 1208 is associated with a containment view 1212 and thus the expanded display for display element MyClassB 1208 includes all items contained by MyClassB 1208. As shown in FIG. 12, MyClassB 1208 includes field 3 (1220) and method 2 (1222).

Figure 13:
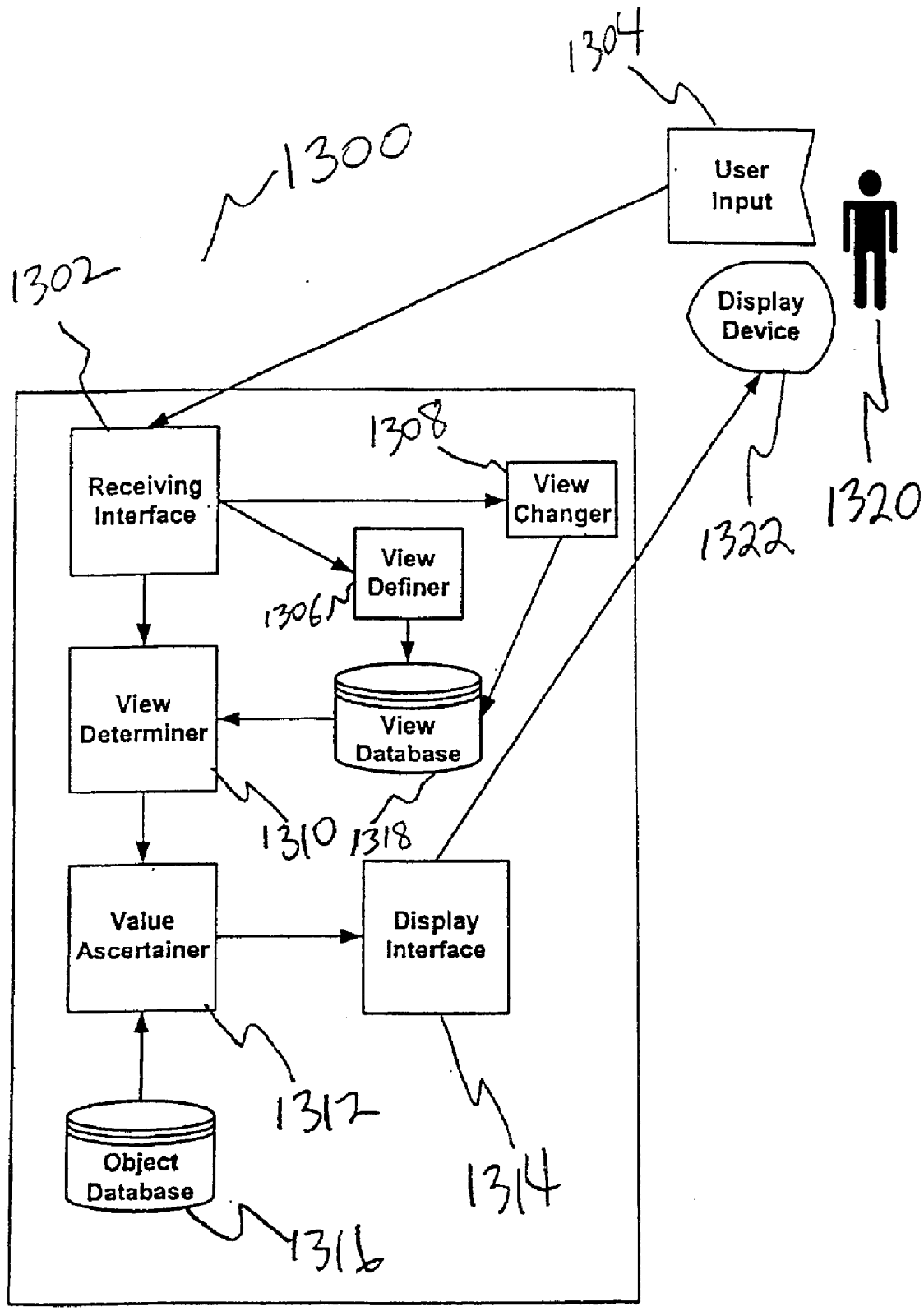
FIG. 13 is a block diagram that illustrates a system for displaying display element attribute values in accordance with one embodiment of the present invention.

Turning now to FIG. 13, a block diagram that illustrates a system for displaying display element attribute values in accordance with one embodiment of the present invention is presented. Display system 1300 includes a receiving interface 1302 for receiving user input 1304, a view definer 1306 for defining a view based upon user input 1304, a view changer 1308 for changing a view and a view determiner 1310 for determining the view associated with a display element. Display system 1300 also includes a value ascertainer 1312 for ascertaining the values associated with display element attributes using a particular view and a display interface 1314 to display the display element attribute values on display device 1322. Object database 1316 stores object values including attribute data and view database 1318 stores views associated with display elements.

In operation, view definer 1306 receives view definitions from a user 1320 via receiving interface 1302 and stores the view definitions in view database 1318. View determiner 1310 receives a display element attribute value request from a user via receiving interface 1302 and obtains the view associated with the display element from view database 1318. Value ascertainer 1312 receives a display element and associated view from view determiner 1310 and ascertains values for each attribute defined in each elementary view from object database 1316 and forwards the results to display interface 1314. Display interface 1314 receives the attribute values from view value ascertainer 1312 and formats the data for display on display device 1322. View changer 1308 accepts a view modification from user 1320 via receiving interface 1302 and stores the modified view in view database 1318 for subsequent display on display device 1322. According to other embodiments of the present invention, view definitions and view modifications are received from a computer program.

Figure 14:
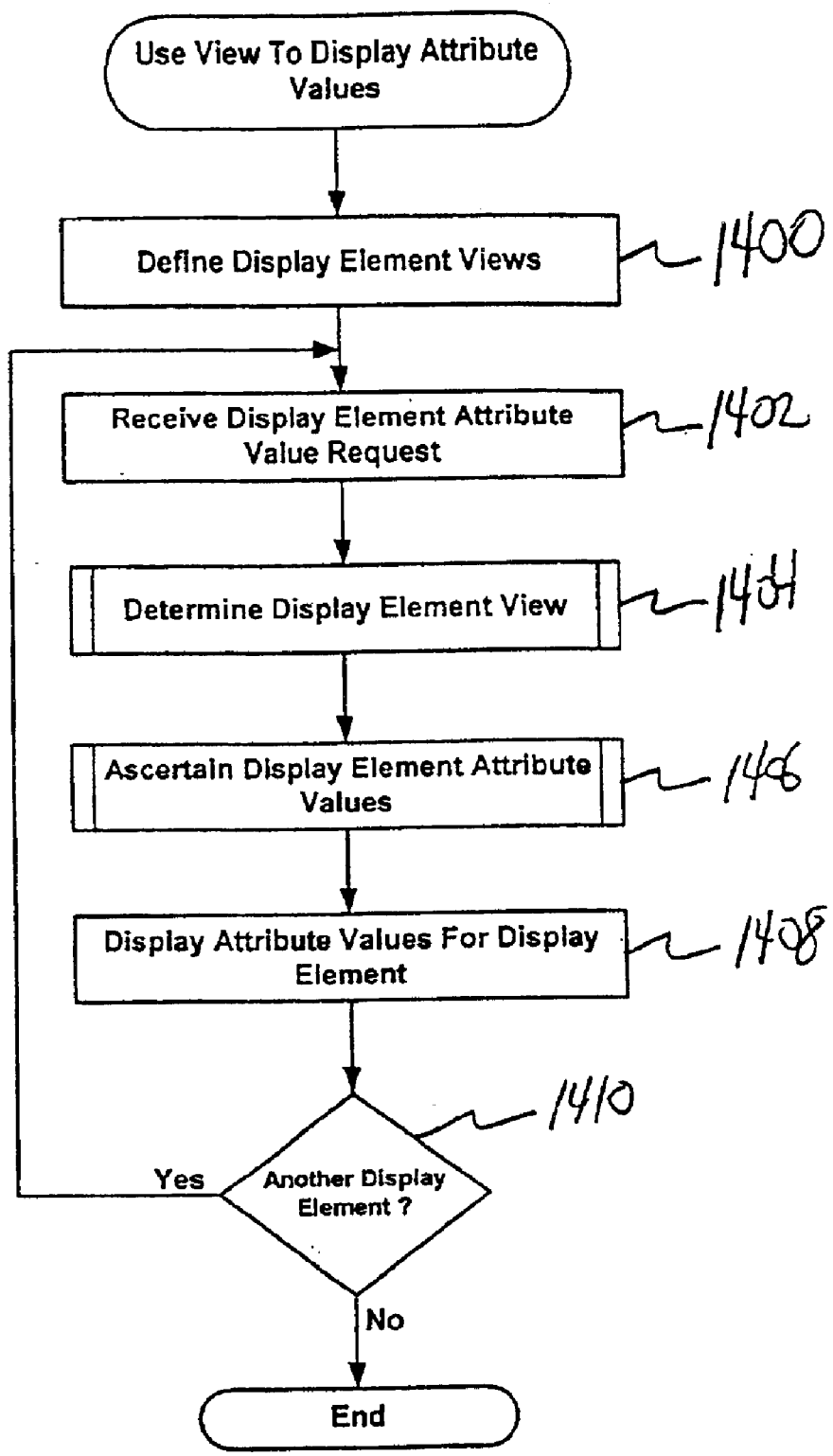
FIG. 14 is a flow diagram that illustrates a method for displaying display element attribute values in accordance with one embodiment of the present invention.

Turning now to FIG. 14, a flow diagram that illustrates a method for displaying display element attribute values in accordance with one embodiment of the present invention is presented. At 1400, display element views are defined. Views may set for one or more display elements, each of which is tied to a particular display form. Views may be defined for one or more kind of display element.

At 1402, a display element attribute value request is received. For example, suppose a file browser application tree form requires "name" and "icon" values for each root display element when the file browser application begins. In this case, a request for "name" attribute values or "icon" attribute values is received at 1402. Continuing the file browser example, suppose that the tree form requires values for a "children" attribute when a folder is expanded. Here, a request for "children" attribute values is received at 1402. Likewise, suppose the file browser application tree form requires "action" attribute values when a user right-clicks on a display element. In this case, a request for "action" attribute values is received at 1402.

At 1404, the view defined for the selected display element is determined by extracting a view definition from a view database. At 1406, the display element attribute values requested at 1402 ascertained, using the view determined at 1404. At 1408, the attribute values determined at reference numeral 1406 are displayed on a display device. At 1410, a determination is made regarding whether there are more display elements. If so, processing continues at reference numeral 1402.

According to one embodiment of the present invention, a display element that is not associated with a view uses the view associated with a related display element to determine which display element attribute values are displayed. The related display element may be, by way of example, a "parent" display element. This embodiment is described in more detail below with reference to FIG. 15.

Figure 15:
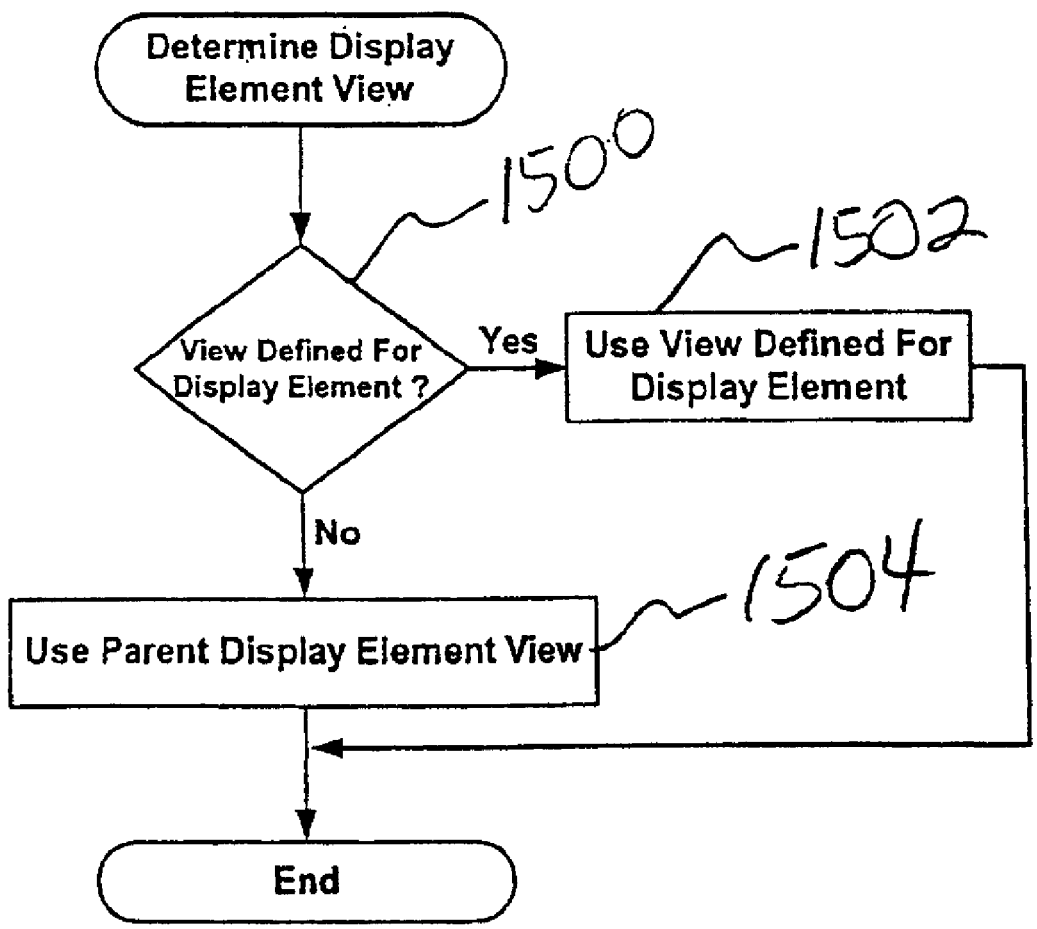
FIG. 15 is a flow diagram that illustrates a method for determining a display element view in accordance with one embodiment of the present invention.

Turning now to FIG. 15, a flow diagram that illustrates a method for determining a display element view in accordance with one embodiment of the present invention is presented. FIG. 15 provides more detail with respect to reference numeral 1402 of FIG. 14. At 1500, a determination is made regarding whether a view is defined for the display element. If a view is defined for the display element, at 1502, the display element view to use is set to the view defined for the display element. If a view is not defined for the display element, at 1504, the display element view to use is set to the view associated a parent display element.

Figure 16:
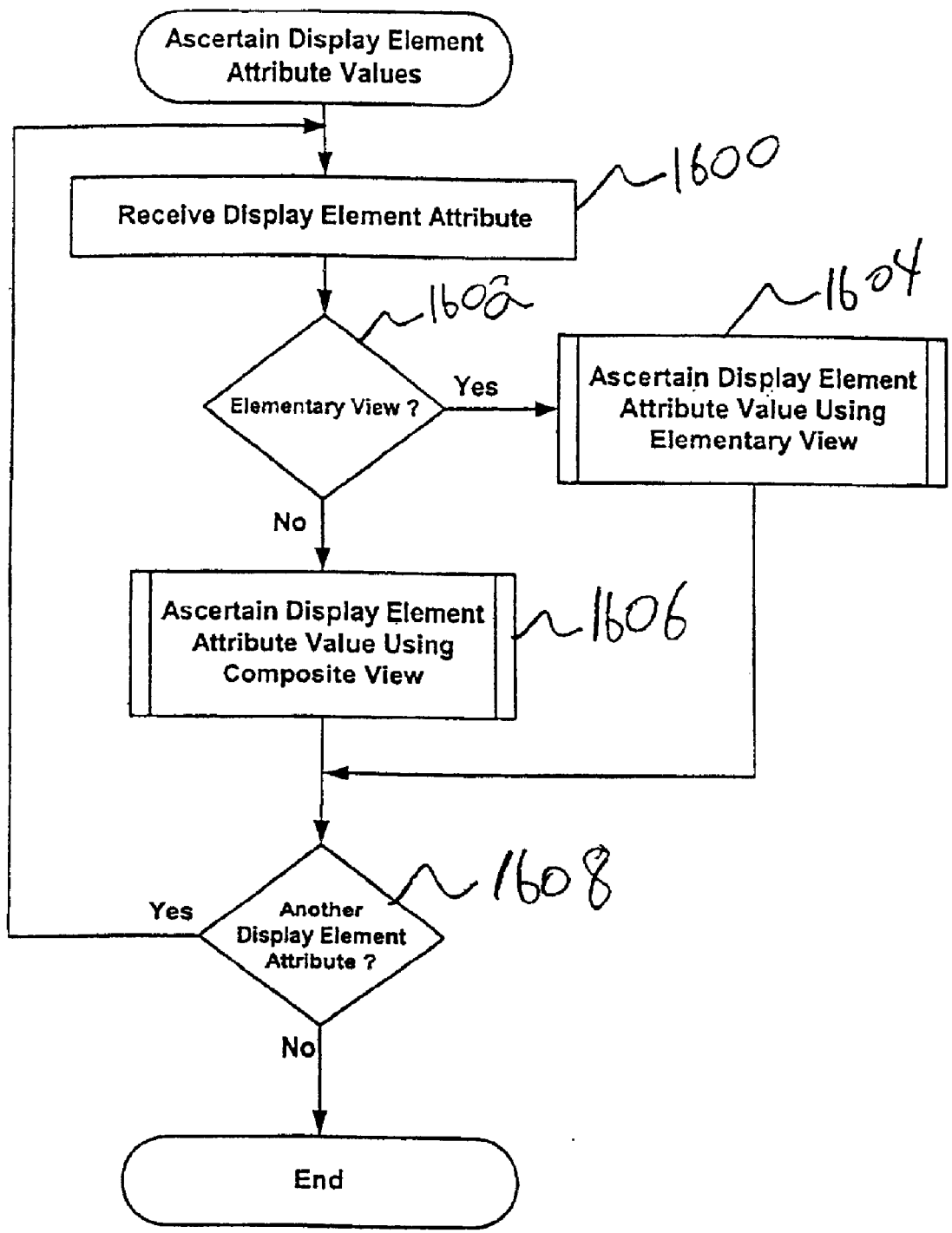
FIG. 16 is a flow diagram that illustrates a method for ascertaining display element attribute values in accordance with one embodiment of the present invention.

Turning now to FIG. 16, a flow diagram that illustrates a method for ascertaining display element attribute values in accordance with one embodiment of the present invention is presented. FIG. 16 provides more detail with respect to reference numeral 1404 of FIG. 14. At 1600, a display element attribute is received. At 1602, a determination is made regarding whether the view is an elementary view or a composite view. If the view is an elementary view, at 1604, the display element attribute value is ascertained using the elementary view. If the view is a composite view, at 1606, the display element attribute value is ascertained using the composite view. At 1608, a determination is made regarding whether another display element attribute remains to be processed. If another display element attribute remains, processing continues at 1600.

Figure 17:
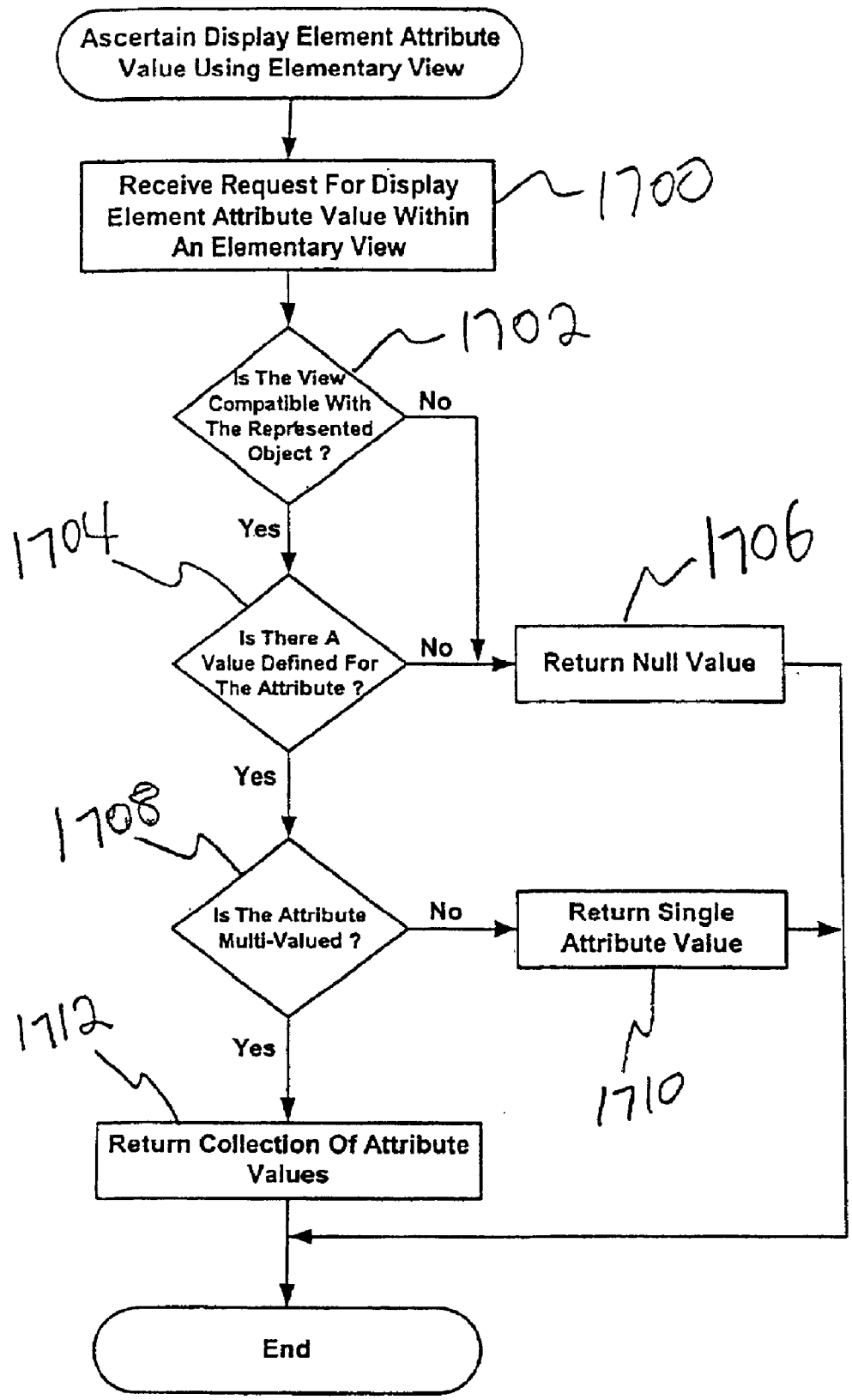
FIG. 17 is a flow diagram that illustrates a method for ascertaining a display element attribute value using an elementary view in accordance with one embodiment of the present invention.

Turning now to FIG. 17, a flow diagram that illustrates a method for ascertaining a display element attribute value using an elementary view in accordance with one embodiment of the present invention is presented. FIG. 17 provides more detail with respect to reference numeral 1604 of FIG. 16. At 1700, a request for display of display element attribute value within an elementary view is received. At 1702, a determination is made regarding whether the elementary view is compatible with the object represented by the display element. At 1704, a determination is made regarding whether there is a value defined for the attribute. If the elementary view is incompatible with the represented object, or if there is no value defined for the attribute, at 1706, an indication that no value is defined for the attribute is returned. If the elementary view is compatible with the represented object and if there is a value defined for the attribute, at 1708, a determination is made regarding whether the attribute is multi-valued. If the attribute is single-valued, the attribute value is returned at 1710. If the attribute is multi-valued, the attribute values are returned at 1712.

Figure 18A:
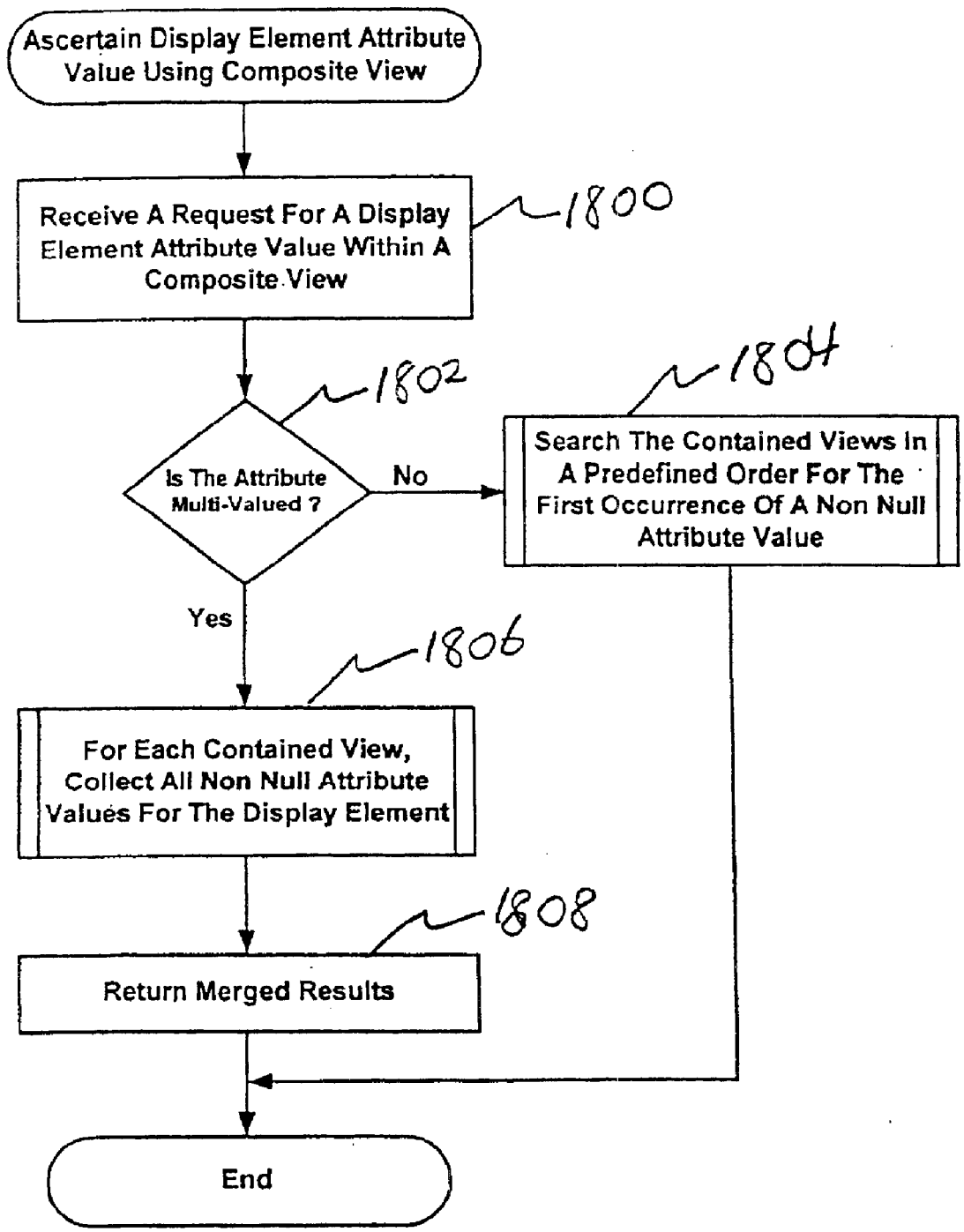
FIG. 18A is a flow diagram that illustrates a method for ascertaining a display element attribute using a composite view in accordance with one embodiment of the present invention.

Turning now to FIG. 18A, a flow diagram that illustrates a method for ascertaining a display element attribute using a composite view in accordance with one embodiment of the present invention is presented. FIG. 18A provides more detail with respect to reference numeral 1606 of FIG. 16. At 1800, a request for display of display element attribute value within a composite view is received. At 1802, a determination is made regarding whether the attribute is multi-valued. If the attribute is single-valued, at 1804, the contained views are searched in a predefined order and the first occurrence of a value for the particular attribute is returned. If the attribute is multi-valued, at 1806, all values for the particular attribute are collected for each contained view. At 1808, the results from reference numeral 1806 are merged together and returned.

Figure 18B:
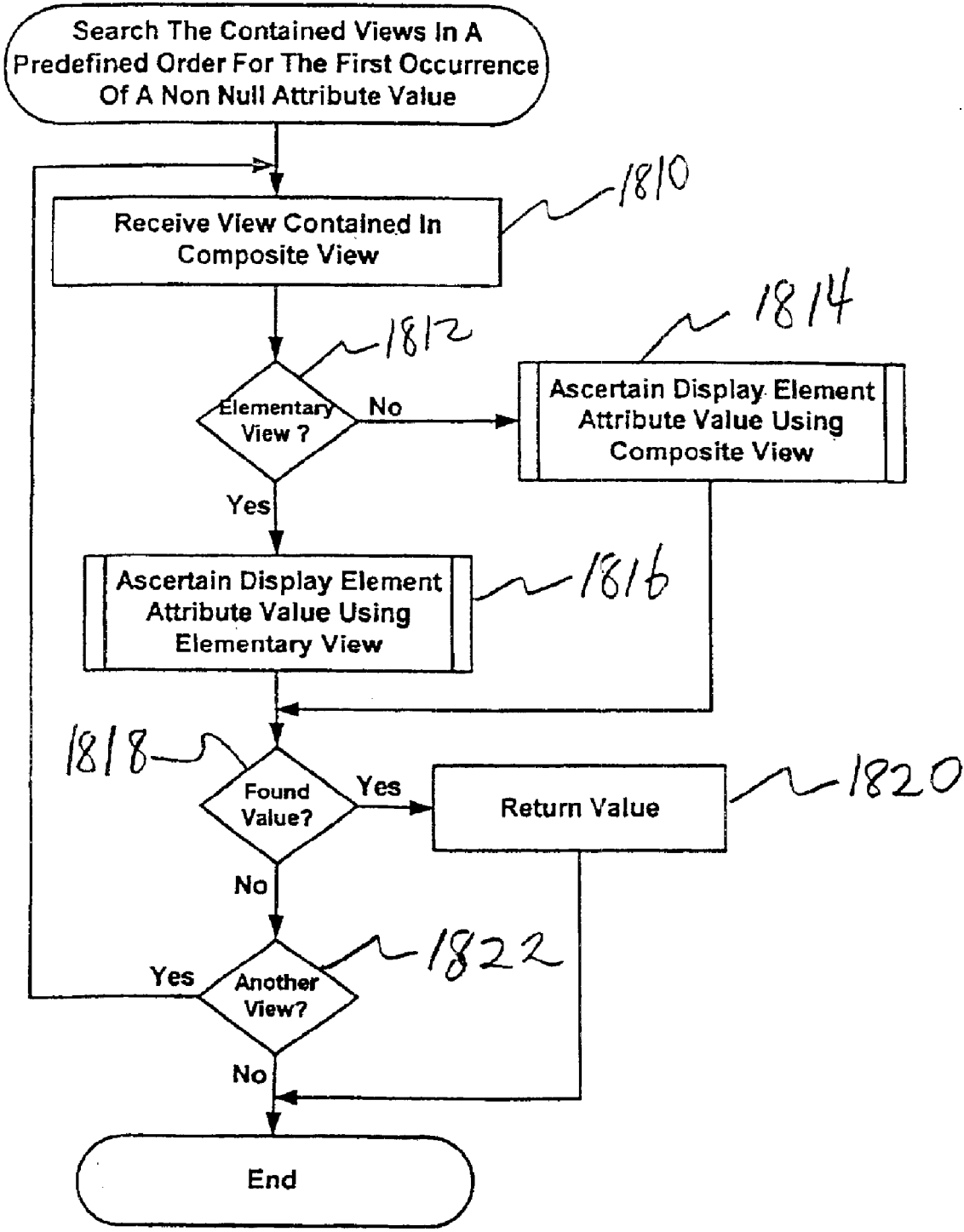
FIG. 18B is a flow diagram that illustrates a method for searching views contained in a composite view in accordance with one embodiment of the present invention.

FIG. 18B is a flow diagram that illustrates a method for searching views contained in a composite view in accordance with one embodiment of the present invention. FIG. 18B provides more detail for reference numeral 1804 in FIG. 18. At 1810, a view contained within a composite view is received. At 1812, a determination is made regarding whether the view is an elementary view. If the view is a composite view, at 1814, the display element attribute value is ascertained using the composite view. If the view is an elementary view, at 1816, the display element attribute value is ascertained using the elementary view. If a value was found as a result of the processes at 1814 or 1816, the value is returned at 1820. If a value was not found, the next view is processed at 1810. This process continues until a value is found, or until all the contained views have been examined.

Figure 18C:
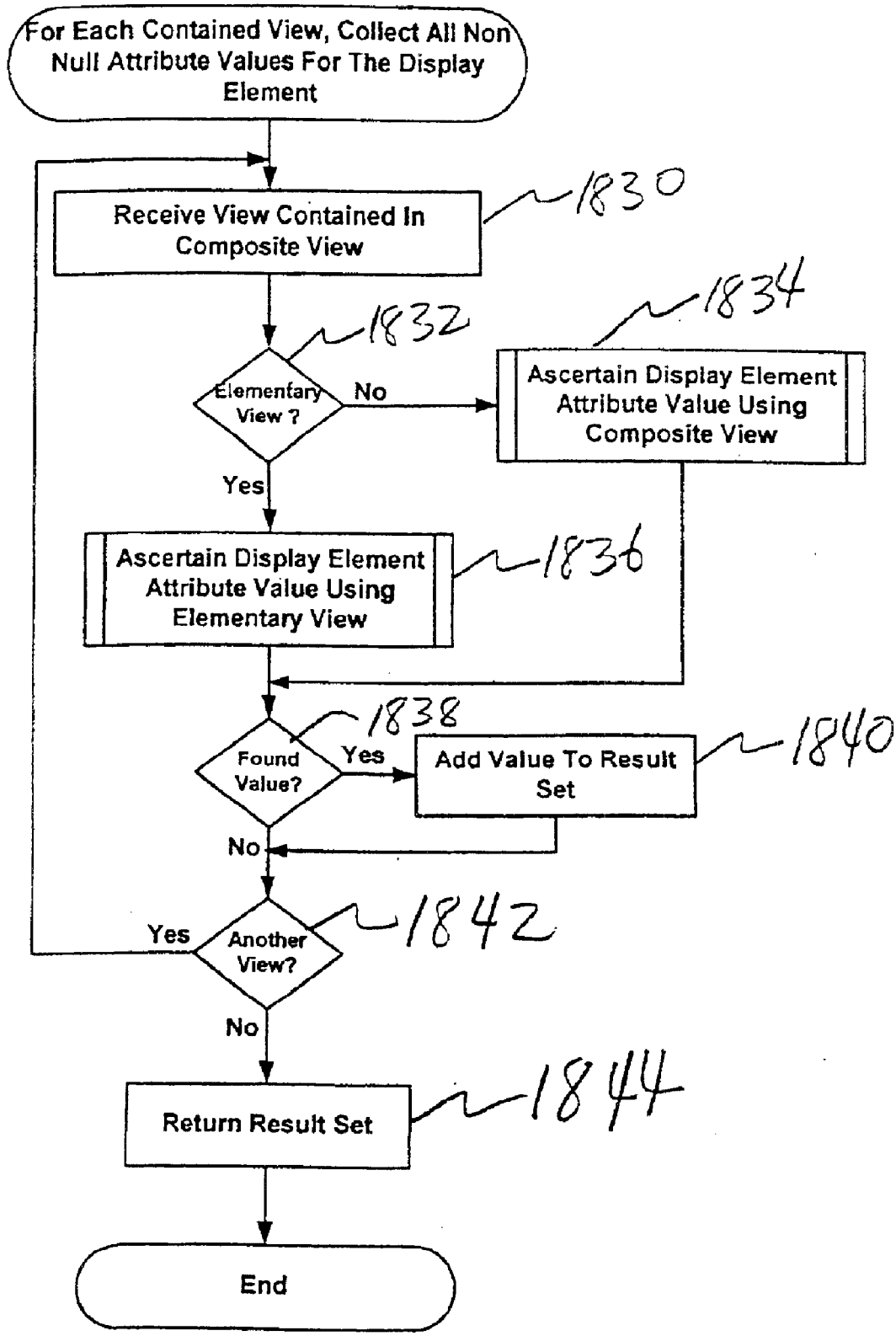
FIG. 18C is a flow diagram that illustrates a method for collecting attribute values for a display element using multiple views in accordance with one embodiment of the present invention.

FIG. 18C is a flow diagram that illustrates a method for collecting attribute values for a display element using multiple views in accordance with one embodiment of the present invention. FIG. 18C provides more detail for reference numeral 1806 in FIG. 18. FIG. 18C is similar to FIG. 18B, except that the process illustrated by FIG. 18C does not stop after finding a value. Instead, the returned values for all contained views are collected before returning a set of values for a multi-valued attribute at 1844.

Figure 19:
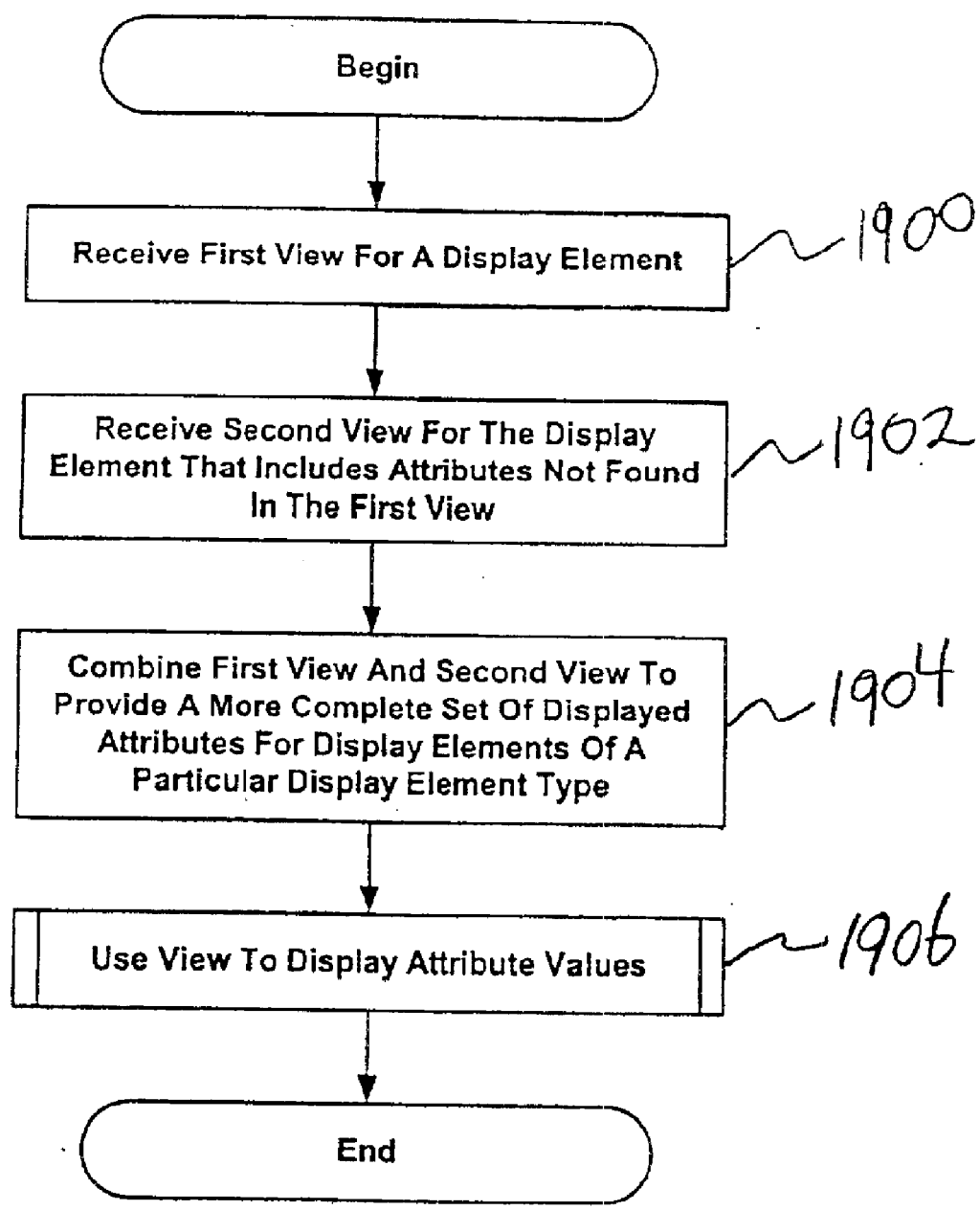
FIG. 19 is a flow diagram that illustrates a method for combining views to provide a more complete attribute set for display elements of a particular type in accordance with one embodiment of the present invention.
Figure 20:
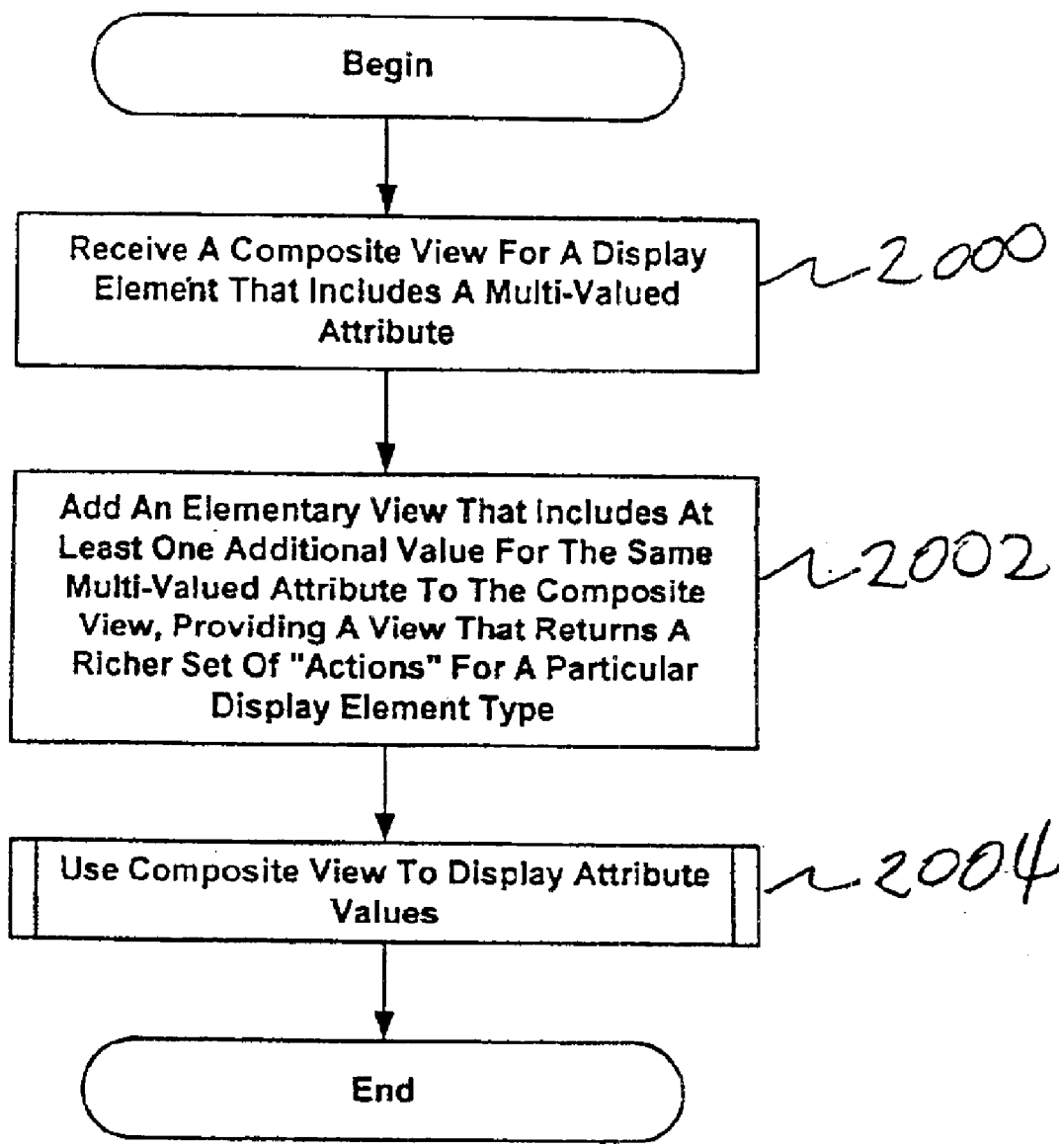
FIG. 20 is a flow diagram that illustrates a method for adding values to a multi-valued attribute in accordance with one embodiment of the present invention.
Figure 21:
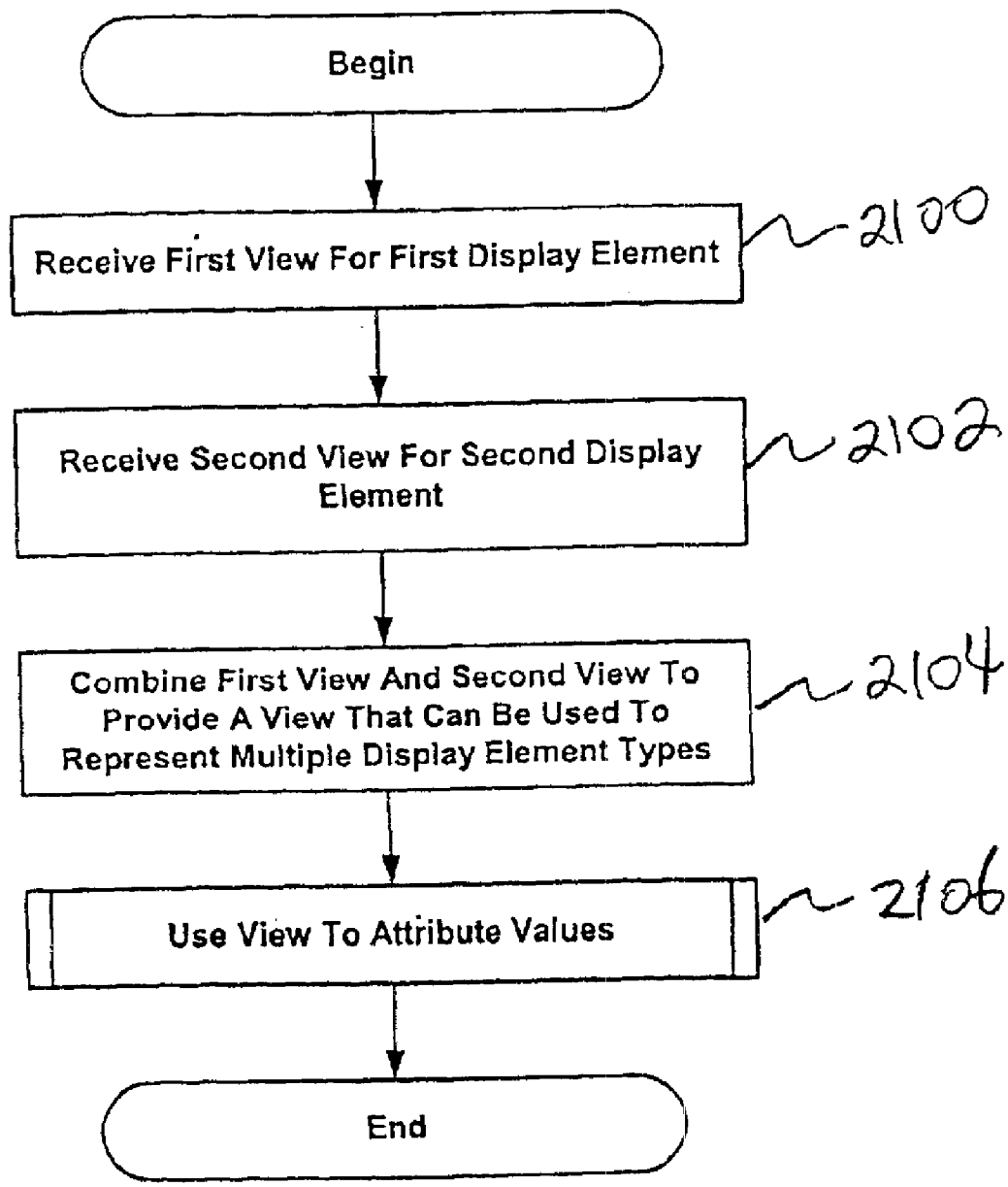
FIG. 21 is a flow diagram that illustrates a method for combining views for different display element types in accordance with one embodiment of the present invention.

Composite views may be used for several purposes in accordance with embodiments of the present invention. Composite views may be used, by way of example, to provide a more complete set of attributes for a particular display element type, to extend the options available for existing multi-valued attributes, or to provide a view that can be used for different display element types. These embodiments are described in more detail below, with reference to FIGS. 19–21. FIGS. 19–21 illustrate three different applications of the method illustrated by FIG. 18B.

According to one embodiment of the present invention, multiple views may be combined to provide a more complete set of attributes for a particular type of display element. As mentioned above, the set of display element attributes is predetermined based on the display form. However, a view may be defined to return attribute values for any number of the attributes. For example, suppose the set of display element attributes for a particular display element is (name, icon, sub-elements) and that view V1 provides the name attribute, view V2 provides the icon attribute and view V3 provides sub-elements. Combining views V1, V2 and V3 creates a composite view that provides a more complete set of attributes (name, icon, sub-elements) for the particular type of display element. This embodiment of the present invention is described below in more detail with reference to FIG. 19.

Turning now to FIG. 19, a flow diagram that illustrates a method for combining views to provide a more complete attribute set for display elements of a particular type in accordance with one embodiment of the present invention is presented. At 1900, a first view for a display element is received. At 1902, a second view for the same display element is received. The second display element includes at least one display element attribute that is not found in the first view. At 1904, the first view and the second view are combined to create a third view. At 1906, the third view is used for the display of display element attribute values.

According to another embodiment of the present invention, composite views may be used to extend the options available for existing multi-valued attributes. For example, suppose elementary view V1 provides popup menu actions for clipboard operations (cut, paste, copy, etc.) on a particular type of display element, and that view V2 provides actions for deleting and creating new objects for the same type of display element. Combining views V1 and V2 creates a composite view that extends the popup menu actions for a particular type of display element.

As another example of the above embodiment, consider a file browser that defines a set of views for files and folders. The file browser application has a composite view that contains the various views and the composite view is associated with all files and folders. According to this embodiment of the present invention, adding a new functionality is accomplished by adding a new elementary view that includes the new functionality to the composite view. Thus, by way of example, adding the ability to pack or unpack files and folders using ZIP compression is accomplished by creating an elementary view that includes the "pack" and "unpack" actions and then adding the new elementary view to the composite view. This embodiment of the present invention is described below in more detail with reference to FIG. 20.

Turning now to FIG. 20, a flow diagram that illustrates a method for adding values to a multi-valued attribute in accordance with one embodiment of the present invention is presented. At 2000, a composite view is received. The composite view includes at least one multi-valued attribute. At 2002, an elementary view that includes at least one additional value for the same multi-valued attribute is added to the composite view, providing a modified composite view that returns a richer set of actions for a particular display element type. Using the example above, the first view is the original composite view and the elementary view includes the pack and unpack actions. At 2004, the modified composite view is used for the display of display element attribute values.

According to another embodiment of the present invention, composite views may be used to provide a view that can be used for different display element types. For example, suppose a program display application is used to display a program written in Java™ and C++. View V1 returns properties for Java™ classes and view V2 returns properties for C++ classes. A composite view containing both V1 and V2 can be used to represent both types of classes. This embodiment of the present invention is described below in more detail with reference to FIG. 21.

Turning now to FIG. 21, a flow diagram that illustrates a method for combining views for different display element types in accordance with one embodiment of the present invention is presented. At 2100, a first view for a first display element is received. At 2102, a second view for a second display element is received. At 2104, the first view and the second view are combined. At 2106, the third view is used for the display of display element attribute values.

Embodiments of the present invention provide a number of important advantages. Allowing views that are configurable for each display element in a net provides added flexibility. This capability allows users to tailor a view of a system according to their particular requirements, and to change the view dynamically.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A graphical user interface for use on a computer system, the graphical user interface enables the determination of display element attribute values for a display element that represents an object in a composite view, the composite view containing a plurality of views, the display element having at least one attribute associated therewith, each attribute having at least one attribute value, the graphical user interface comprising:

a receiving interface to receive a display element attribute value request;

a view determiner to determine the composite view for the display element based upon the display element attribute value request; and a value ascertainer to ascertain at least one attribute value for the display element based upon the composite view, wherein said value ascertainer is configured to:

when said attribute is single-valued, search each of the plurality of views contained by said composite view for a value for said attribute and return said value.

2. The graphical user interface as defined in claim 1, wherein said value ascertainer is further configured to, when said attribute is multi-valued, collect all values for said attribute for each of the plurality of views contained by said composite view, merge said values obtained by said collecting, and return said merged values.

* * * * *